(12) United States Patent
Erondu et al.

(10) Patent No.: US 12,547,297 B2
(45) Date of Patent: Feb. 10, 2026

(54) EMPLOYEE WORKFLOW NAVIGATION SYSTEM

(71) Applicant: Degree, Inc, San Francisco, CA (US)

(72) Inventors: Jared Erondu, New York, NY (US); Byron Sha Yang, San Jose, CA (US); Jack Hanford, San Francisco, CA (US); Jay Ashish Mahabal, New York, NY (US); Rahul Rangnekar, San Francisco, CA (US); Manpreet Kaur Bocharova, Austin, TX (US); Ian William Richard, San Francisco, CA (US); Claire Rowell, San Francisco, CA (US); J Zac Stein, San Francisco, CA (US); Stephen Poletto, San Francisco, CA (US); Eric Koslow, San Francisco, CA (US); Derek John Embry, San Francisco, CA (US); Seth Goldenberg, Berkeley, CA (US); Elliot Piersa Dahl, Nashville, TN (US); Luc Chaissac, Bordeaux (FR); Johanna Weintraub, San Francisco, CA (US); Megan McGowan, Albany (CA); Nicole Jensen McMullin, Larkspur (CA)

(73) Assignee: Degree, Inc, San Francisco, CA (US)

( * ) Notice: Subject to any disclaimer, the term of this patent is extended or adjusted under 35 U.S.C. 154(b) by 0 days.

(21) Appl. No.: 18/184,266

(22) Filed: Mar. 15, 2023

(65) Prior Publication Data

US 2023/0305677 A1    Sep. 28, 2023

Related U.S. Application Data

(60) Provisional application No. 63/269,396, filed on Mar. 15, 2022.

(51) Int. Cl.
G06F 3/0482    (2013.01)
G06F 3/04847   (2022.01)

(52) U.S. Cl.
CPC ........ G06F 3/0482 (2013.01); G06F 3/04847 (2013.01)

(58) Field of Classification Search
CPC .......................... G06F 3/0482; G06F 3/04847
See application file for complete search history.

(56) References Cited

U.S. PATENT DOCUMENTS 5,161,535 A * 11/1992 Short .................. G01S 7/52084
                                                                 715/810
9,342,497 B1 * 5/2016 Waite ...................... G06F 40/18
(Continued)

FOREIGN PATENT DOCUMENTS

CA    3159841 A1 *  6/2021  ............ G05B 15/02
CN    109474456 A *  3/2019  ......... H04L 41/0813
(Continued)

OTHER PUBLICATIONS

Symfony, "Creating and Using Templates", published on Nov. 28, 2017 to https://symfony.com/doc/4.1/templating.html, retrieved Nov. 30, 2023. (Year: 2017).*

(Continued)

*Primary Examiner* — Shourjo Dasgupta
(74) *Attorney, Agent, or Firm* — Schwegman Lundberg & Woessner, P.A.

(57) ABSTRACT

A method of quickly accessing a tool via a graphical user interface is disclosed. Based on a detection of a selection of a menu item from a menu presented in a first region of a graphical user interface (GUI), a collapsible panel is caused to be displayed in a second region of the GUI. The collapsible panel includes one or more additional menu items corresponding to one or more sub-categories associated with
(Continued)

the menu item. Based on a selection of one of the one or more additional menu items, dynamic access is allowed to the tool. The tool pertains to the one of the one or more additional menu items. The allowing of the dynamic access includes providing an activatable user interface element in a third region of the GUI. An activation of the activatable user interface element is configured to invoke a functionality of the tool.

14 Claims, 51 Drawing Sheets

(56) References Cited

U.S. PATENT DOCUMENTS

| | | | | |
|---|---|---|---|---|
| 9,348,489 | B1* | 5/2016 | Cline | G06F 3/0482 |
| 2008/0033777 | A1* | 2/2008 | Shukoor | G06Q 10/06 |
| | | | | 705/7.11 |
| 2008/0178125 | A1* | 7/2008 | Elsbree | G06F 3/0482 |
| | | | | 715/862 |
| 2010/0064258 | A1* | 3/2010 | Gorczowski | G06F 3/0482 |
| | | | | 715/841 |
| 2012/0030631 | A1* | 2/2012 | Gonzalez | G06F 9/451 |
| | | | | 715/854 |
| 2012/0096410 | A1* | 4/2012 | Lancaster | G06F 3/0482 |
| | | | | 715/854 |
| 2012/0150634 | A1* | 6/2012 | Shimpa | G06Q 30/0276 |
| | | | | 705/14.49 |
| 2014/0380147 | A1* | 12/2014 | Huang | G06F 9/451 |
| | | | | 715/234 |
| 2015/0348296 | A1* | 12/2015 | Chapman | G06T 11/206 |
| | | | | 345/440.2 |
| 2016/0092176 | A1* | 3/2016 | Straub | G06F 8/34 |
| | | | | 717/107 |
| 2020/0026397 | A1* | 1/2020 | Wohlstadter | G06F 3/0482 |
| 2020/0364290 | A1* | 11/2020 | Bose | H04L 67/535 |
| 2021/0117056 | A1* | 4/2021 | Kuo | G06F 3/0484 |
| 2021/0200393 | A1* | 7/2021 | Wohlstadter | G06F 3/04886 |
| 2021/0278934 | A1* | 9/2021 | Hunter | G06F 3/0482 |

FOREIGN PATENT DOCUMENTS

| | | | | | |
|---|---|---|---|---|---|
| CN | 112416214 | A | * | 2/2021 | G06F 3/0482 |
| CN | 113468448 | A | * | 10/2021 | |
| JP | 5468261 | B2 | * | 4/2014 | G05B 23/0286 |
| TW | I482079 | B | * | 4/2015 | G06F 3/0482 |

OTHER PUBLICATIONS

Oracle, "Fusion Middleware Developing with Oracle WebCenter Sites", published on Oct. 28, 2015 to https://docs.oracle.com/middleware/12213, retrieved Nov. 30, 2023. (Year: 2015).*

Aaron Reed, etc., "Exploring User Preference for the Dashboard Menu Design", published via 2009 42nd Hawaii International Conference on System Sciences, held Jan. 5-Jan. 8, 2009, retrieved Jun. 11, 2024. (Year: 2009).*

Ronald Aveling, etc., "Hierarchies, Graphs, and Navigation", published Mar. 6, 2021 to https://www.sanity.io/guides/hierarchies-graphs-navigation, retrieved Jun. 11, 2024. (Year: 2021).*

* cited by examiner

FIG. 6

Profile card — Welcome back, Laura!

Laura Memphis
Customer Service Manager
4 active goals
2 growth areas
Q2 Engagement Survey — View results
- My team
- Custom Experience
- Degree Inc.

Quick actions:
- Give feedback
- Plan 1:1s
- Create goal

Tasks & Upcoming 2 tasks to complete
Write your reviews Q3 2020 Reviews — 44% >
Review your team's updates for this week — 2 shared today >

Coming up
1:1 with Mel — Today @ 9:30am >
1:1 with Biacna — Today @ 10:00am >
Write your weekly update — Friday >

Discovery Navigation:
- Lattice
- Home •3
- People
- Reporting
- Goals
- Grow
- Search
- Help center
- Account

- Lattice
- Home • 99+
- People
- Reporting
- OKURRs
- Grow
- Search
- Help center
- Admin
- Account 👋 Welcome back, Graul Paul!

Graul Paul Maulson
CMO

☐ Customer Success
☐ LETTUCE SANDBAWKS

○ Give feedback
○ Plan 1:1s
○ Create OKURR 106 tasks to complete

New Pulse survey                                  5 questions >
Take a minute to share your thoughts on these topics

Perform your reviews                              0%  >
remove reviews

Perform your reviews                              33%  >
Manager changing full 360 (elliot)

Show more tasks

Coming up

1:1 with   Elliot          Wednesday @ 7:00am  >

Weekly update                              Today  >

⊙ Help waiting for latticesandbox.latticehq.com...

≋ Lattice   Home   People   Reporting

👋 Welcome back, Laura!
5 tasks to complete

Review your team's updates ›
3 updates ready to review

Update your goal ›
Acquire 10 Canadian customers

Write your weekly update ›
How was the week?

Select peer reviewers ›
Degree Annual 360

Action items

Upcoming 1:1s
- 1:1 with Mel Miller — Today @ 9:30am [Plan 1:1]
- 1:1 Margarat Gillian — Today @ 11:30am [Plan 1:1]
- 1:1 Corey Travis — Thursday @ 9:30am [Plan 1:1]

Show more...

Your team

Updates

YOU
- Laura Memphis
- Bianca Breg
- Your team
  - Corey Travis
  - Jonathan Castro
  - Margaret Gillian
  - Mel Miller
  - Customer Experien...
  - Lorem Inc.
- RELATIONSHIPS
  - Dylan Choi
  - Fiona Landree

Laura Memphis
Customer Service Manager

[Overview] 1:1s  Updates  Feedback  Growth  Reviews

Your goals

Grow customer book to $1 million in renewals  ✎ Draft

90% + logo retention of customers ▬▬▬ 90%

• Maintain an NPS of 70 post implementation [Progressing]

Your current growth areas

Growth mindset
Strategic partnership            Last updated: 2 weeks

Developing best practices
Leadership                       Last updated: 1 day

About Laura
I like to climb rocks and save shellfish from becoming dinner. Originally from Seattle. Big fan of iced coffee!

PRONOUNS
She/Her/Hers

LOCATION
San Francisco, CA

EMAIL
employee@company.com

DEPARTMENT
Customer Experience

MANAGER
Margaret Gillian

DIRECT REPORTS (4)
PEERS (5)
- Margaret Gillian
- Margaret Gillian
- Margaret Gillian
- Margaret Gillian

Engagement surveys shared with you

Pulse survey                     View results

- Laura Memphis
- My team
  - Corey Travis
  - Jonathan Castro
  - Margaret Gillian
  - Mel Miller
- Customer Experien...
- Lorem Inc.
  - Bianca Breg
  - Dylan Choi
  - Fiona Landree

Laura Memphis
Customer Service Manager

[Overview] 1:1s  Updates  Feedback  Growth  Reviews

My goals                                                    Create goal

Grow customer book to $1 million in renewals    [Draft]

90% + logo retention of customers                  90%

Maintain an NPS of 70 post implementation    [Progressing]

My growth areas

| Ownership mindset | Self Regulation and Empathy |
| Strategic partnership | Emotional intelligence |
| Last updated 2 weeks ago | Last updated 1 day ago |

Sentiment (last 4 updates)    3.8

About

DEPARTMENT
Customer Experience

MANAGER
- Bianca Berg

DIRECT REPORTS (4)    PEERS (5)
- Corey Travis
- Jonathan Castro
- Margaret Gillian
- Mel Miller Show more

Shared with you

Pulse Survey [ACTIVE]           View results

Q3 Engagement Survey           View results

- Laura Memphis
- My team
  - Corey Travis
  - Jonathan Castro
  - Margaret Gillian
  - Mel Miller
  - Customer Experien...
  - Lorem Inc.
  - Bianca Breg
  - Dylan Choi
  - Fiona Landree

Laura Memphis
Customer Service Manager

[Overview] 1:1s  Updates  Feedback  Growth  Reviews

My goals                                    Create goal

Grow customer book to $1 million in renewals  [✎ Draft]

90% + logo retention of customers  ▓▓▓▓▓▓ 90%

Maintain an NPS of 70 post implementation  [Progressing]

My growth areas

| Ownership mindset | Self Regulation and Empathy |
| Strategic partnership | Emotional intelligence |
| Last updated 2 weeks ago | Last updated today |

Shared with you

Pulse Survey [ACTIVE]                           View results

Q3 Engagement Survey                            View results

☺ 3.8

Sentiment (last 4 updates)

About

DEPARTMENT
Customer Experience

MANAGER
● Bianca Berg

DIRECT REPORTS (4)
PEERS (5)
● Corey Travis
● Jonathan Castro
● Margaret Gillian
● Mel Miller Show more

EMPLOYEE WORKFLOW NAVIGATION SYSTEM

CROSS-REFERENCE TO RELATED APPLICATIONS

This application claims the benefit of U.S. Provisional Application No. 63/269,396, filed Mar. 15, 2022, entitled "EMPLOYEE WORKFLOW NAVIGATION SYSTEM," which is hereby incorporated by reference herein in its entirety.

TECHNICAL FIELD

The present application relates generally to the technical field of improved display user interfaces for electronic devices, including devices with small screens, such as mobile devices, and, in one specific example, to a set of specialized user interfaces for surfacing information and/or workflows related to workplace tools and facilitating modification of the information in real time.

BACKGROUND

Employees of a corporation may be provided with access to a variety of workplace tools, including tools related to performance management, employee engagement, and career growth. Because so many workplace tools are available, determining which workplace tools are the most relevant for a particular employee, a particular role, and/or a particular task can be daunting.

BRIEF DESCRIPTION OF THE DRAWINGS

Some embodiments are illustrated by way of example and not limitation in the figures of the accompanying drawings.

FIG. 6 is a screenshot depicting an example Home page.

FIG. 7 is a screenshot depicting an example Profile page.

FIG. 9 is a screenshot depicting an example exploration page.

FIGS. 10A-10C are screenshots depicting an example of rendering of a page based on an application of one or more loading optimizations.

FIGS. 14-48 are screenshots of various example user interfaces that may be generated and communicated to a client device.

DETAILED DESCRIPTION

Figure 1:
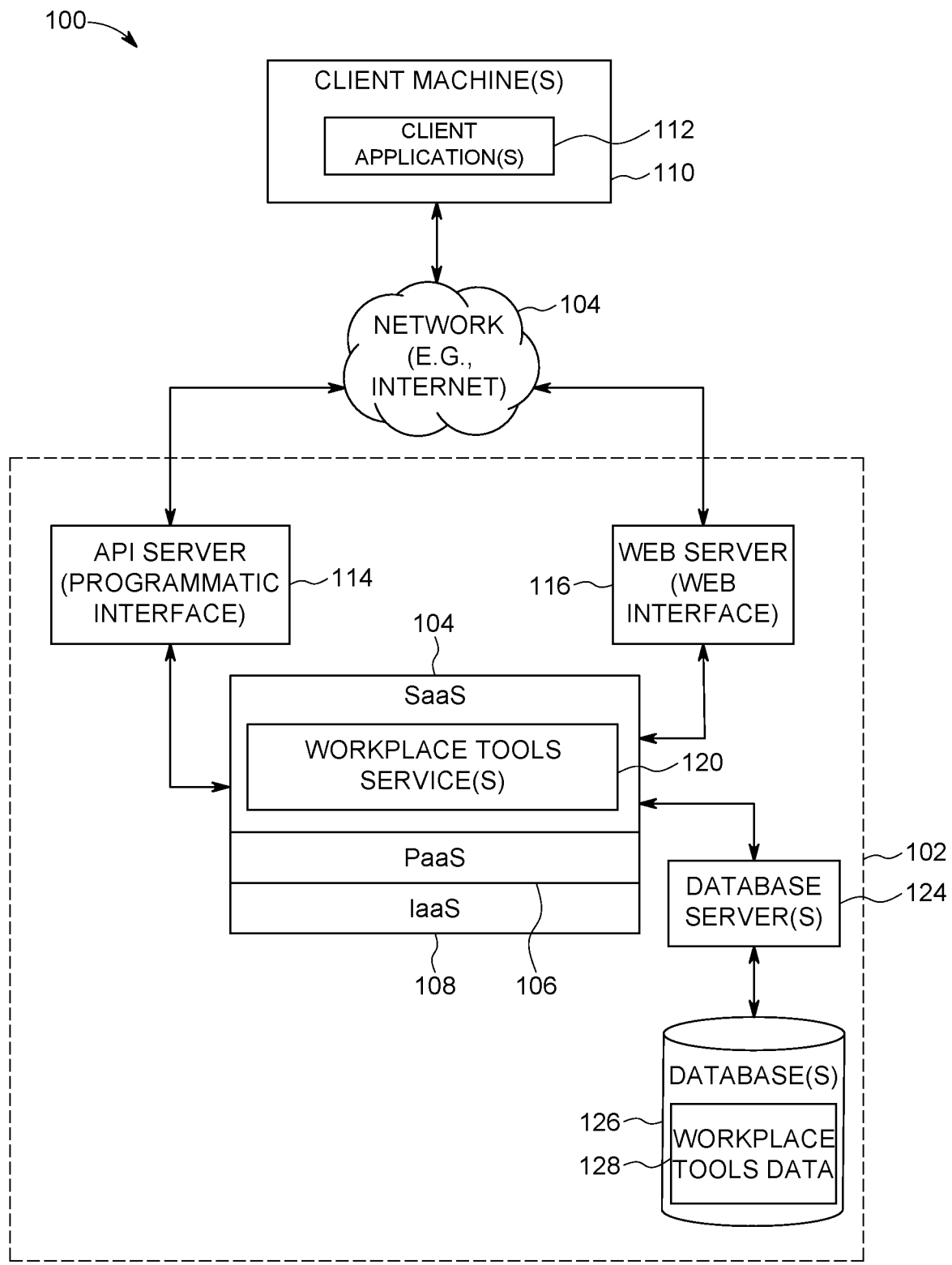
FIG. 1 is a network diagram depicting a cloud-based SaaS system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

A method of providing access to and/or facilitating navigation of workplace tools and associated information, such as information contained in a workplace tools database, and for editing (e.g., adding, modifying, or removing) the associated information in real-time is disclosed. An access point for the workplace tools and/or database, such as a Home page, is provided. Based on information associated with the user accessing the system, such as an employee identification, a role identification, or a task identification associated with a user, a user interface personalized or customized for the user is generated and communicated for presentation on a client device of the user.

A method of quickly accessing a tool via a graphical user interface is disclosed. Based on a detection of a selection of a menu item from a menu presented in a first region of a graphical user interface (GUI), a collapsible panel is caused to be displayed in a second region of the GUI. The collapsible panel includes one or more additional menu items corresponding to one or more sub-categories associated with the menu item. The collapsible panel may be collapsible based on a detection of an additional selection of the menu item from the menu. Based on a selection of one of the one or more additional menu items, dynamic access is allowed to the tool. The tool may pertain to the selected one of the one or more additional menu items. The allowing of the dynamic access includes providing an activatable user interface element in a third region of the GUI. An activation of the activatable user interface element is configured to invoke a functionality of the tool.

In example embodiments, the user interface includes a main menu having one or more selectable menu items for accessing one or more of the workplace tools. The menu items may correspond to one or more categories of workplace tools. In example embodiments, the menu items and/or categories may include one or more of the following: Home (e.g., for providing access to a summary of information and/or workplace tools functionality accessible via the other categories), People (e.g., for editing or otherwise acting upon information pertaining other employees of a company of the user, such as one or more teams of which the user is a member or a manager), Reporting (e.g., for editing or otherwise acting upon data pertaining to employee reports, such as employee status reports), Goals (e.g., for editing or otherwise acting upon tasks pertaining to established goals), Engagement (e.g., for editing otherwise acting upon data pertaining to employer surveys or employer message boards), Grow (e.g., for editing or otherwise acting upon data pertaining to employee growth), and Reviews (e.g., for editing or otherwise acting upon data pertaining to employee performance reviews).

In example embodiments, each category may be further divided into one or more subcategories. In example embodiments, the one or more subcategories may be dynamically navigated via a collapsible panel. In example embodiments, the collapsible panel may be presented between the main menu and one or more display areas, the display areas containing user interface elements for invoking functionality of one or more workplace tools associated with the selected category and/or subcategory. For example, a selection of a People menu item from the main menu may cause a corresponding collapsible panel to be presented that includes options to select one or more subcategories of the People category, such as an individual profile of the user, profiles of team members of one or more teams to which the user belongs, or other subcategories, as discussed or shown herein.

In example embodiments, selecting a category from the main menu and/or a subcategory from the collapsible panel may cause user interface elements to appear in one or more display areas of the user interface, the one or more user interface elements activatable to invoke one or more functions of one or more workplace tools corresponding to the selected category and/or subcategory (e.g., for editing associated data in real time). Additionally, the associated data and/or tools may be further categorized (e.g., using tabs) presented in conjunction with the one more display areas, as described or shown herein. In example embodiments, the collapsible panel is configured to reduce clutter in the user interface, making the user interface more suitable for small screens, including screens of mobile devices, such as mobile phones.

For example, selection of the People menu item from the main window and selection of a Team from the collapsible menu may cause selected real-time data pertaining to the team to be displayed in one or more display areas of the user interface. In example embodiments, the categories, subcategories, or data may be selected based on information pertaining to the user, such as attributes of the user (e.g., title or role), tasks assigned to the user, and so on, as described or shown herein.

For example, based on a determination that the user has a management role, the selected real-time data may include goals owned by the manager's direct reports, updates submitted by direct reports, feedback received from employees, employee status updates (e.g., employee anniversaries), and so on. Tools accessible in the one or more display areas may include tools for reviewing submitted updates, giving praise to an employee, and/or requesting feedback. Functions of each of the tools may be accessed through user interface elements presented in the main display area. In example embodiments, a selection of a user interface corresponding to a function of a tool may cause a further user interface associated with the tool to be presented (e.g., to facilitate the processing of any corresponding action, such as modifying employee data in real-time based on inputs received via the tool's user interface).

A selection of one or more tabs associated with a team may cause presentation of one or more of the following pages in one or more display areas of the interface: an Overview page (for quick access to one or more functions of one or more tools accessible via the pages associated with the other tabs), a 1:1 s page (for editing data pertaining to one-on-one interactions with another employee), an Updates page, a Feedback page, a Growth, or a Reviews page, as described or shown herein. The Overview page may include summaries of tools and/or data provided on the other pages, including user interface elements for accessing one or more functions of the tools. The other pages may present more granular data than what is displayed on the Overview page.

In example embodiments, accessing a page triggers a custom page loading feature that optimizes presentation of the page in real-time (e.g., based on loading of corresponding data from a workplace tools database in real-time).

In example embodiments, each category of the main menu is associated with a collapsible panel for displaying additional information associated with a selection of the category from a main menu. In example embodiments, the collapsible panel may reduce clutter in the user interface (e.g., for easier navigation on devices with small screens).

In example embodiments, upon display of the collapsible panel, each of the menu items included in the main menu is condensed down from a textual representation into a graphical representation such that it takes up less space, such as a narrower band, in the display area. In example embodiments, when the collapsible panel is closed, each of the menu items is expanded out back into its textual representation. In example embodiments, the collapsible panel may be closed by clicking on the graphical representation of the currently selected item on the main menu. In example embodiments, the currently selected items on the main menu and/or the collapsible panel are highlighted (e.g., with a border, color, graphical effect, and/or other indicator).

In example embodiments, one or more user interfaces disclosed herein are accessed by a particular manner, as described. For example, a collapsible panel or secondary window may be reached directly from a main menu and/or one or more additional content areas may be accessible based on activation of a menu item in the collapsible panel. In example embodiments, a limited set of data may be presented during navigation of the user interfaces. For example, a limited set of menu items may be included in the collapsible panel, wherein the limited set of data relates to (e.g., are sub-categories of) a category associated with a menu item selected from the main menu, and/or selected data may be loaded and displayed in one or more content areas, wherein the selected data is based on a selection of a menu item from the collapsible panel. In example embodiments, the data that is displayed in one or more content areas may be a summary of additional data that may be drilled down into (e.g., through activation of one or more interactive user interface elements). In example embodiments, the data presented may be based on a current state of the system, such as a current state of one or more users of the system, including, for example, roles assigned to the user, tasks assigned to the user, tools accessible to the user, and so on, as well as real-time data stored in one or more databases relating to the roles, tasks, or tools, and presentation of such data in one or more regions or content areas of the user interface may be based on the states, templates, and/or schematics, as described herein. Accordingly, at least because of the specific manner disclosed of displaying one or more limited sets of information, rather than merely using conventional user interface methods to display generic data, one or more improved user interfaces for electronic devices are asserted to be disclosed herein.

The disclosed embodiments include one or more systems that perform one or more of the methods, operations, or combinations of operations described or shown herein. The disclosed embodiments include one or more computer readable media having instructions that, when executed on the one or more systems, cause the one or more systems to perform one or more of the methods, operations, or combinations of operations described or shown herein. At least some of these operations or combinations of operations are non-routine and/or unconventional operations or combinations of operations.

FIG. 1 is a network diagram depicting a system 100 within which various example embodiments may be deployed. A networked system 102, in the example form of a cloud computing service, such as Microsoft Azure or other cloud service, provides server-side functionality, via a network 104 (e.g., the Internet or Wide Area Network (WAN)) to one or more endpoints (e.g., client machines 110). FIG. 1 illustrates client application(s) 112 on the client machines 110. Examples of client application(s) 112 may include a web browser application, such as the Internet Explorer browser developed by Microsoft Corporation of Redmond, Washington or other applications supported by an operating system of the device, such as applications supported by Windows, iOS or Android operating systems.

An API server 114 and a web server 116 are coupled to, and provide programmatic and web interfaces respectively to, one or more software services, which may be hosted on a software-as-a-service (SaaS) layer or platform 104. The SaaS platform may be part of a service-oriented architecture, being stacked upon a platform-as-a-service (PaaS) layer 106 which, may be, in turn, stacked upon a infrastructure-as-a-service (IaaS) layer 108 (e.g., in accordance with standards defined by the National Institute of Standards and Technology (NIST)).

While the applications (e.g., workplace tools service(s)) 120 are shown in FIG. 1 to form part of the networked system 102, in alternative embodiments, the applications 120 may form part of a service that is separate and distinct from the networked system 102.

Further, while the system 100 shown in FIG. 1 employs a cloud-based architecture, various embodiments are, of course, not limited to such an architecture, and could equally well find application in a client-server, distributed, or peer-to-peer system, for example. The various server applications 120 could also be implemented as standalone software programs. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various applications 120 via the web interface supported by the web server 116. Similarly, native applications executing on the client machine(s) 110 may accesses the various services and functions provided by the applications 120 via the programmatic interface provided by the API server 114. For example, the third-party applications may, utilizing information retrieved from the networked system 102, support one or more features or functions on a website hosted by the third party. The third-party website may, for example, provide one or more promotional, marketplace or payment functions that are integrated into or supported by relevant applications of the networked system 102.

The server applications 120 may be hosted on dedicated or shared server machines (not shown) that are communicatively coupled to enable communications between server machines. The server applications 120 themselves may be communicatively coupled (e.g., via appropriate interfaces) to each other and/or to various data sources, so as to allow information to be passed between the server applications 120 and so as to allow the server applications 120 to share and access common data. The server applications 120 may furthermore access one or more databases 126 (e.g., via database servers 124). In example embodiments, various data items are stored in the database(s) 126, such as data items 128 (e.g., workplace tools data and/or associated data).

Navigation of the networked system 102 may be facilitated by one or more navigation applications. For example, a search application (as an example of a navigation application) may enable keyword searches of data items included in the one or more database(s) 126 associated with the networked system 102. A browser application may allow users to browse data structures according data items that are classified into information silos as data items 128. Various other navigation applications may be provided to supplement the search and browsing applications.

Figure 2:
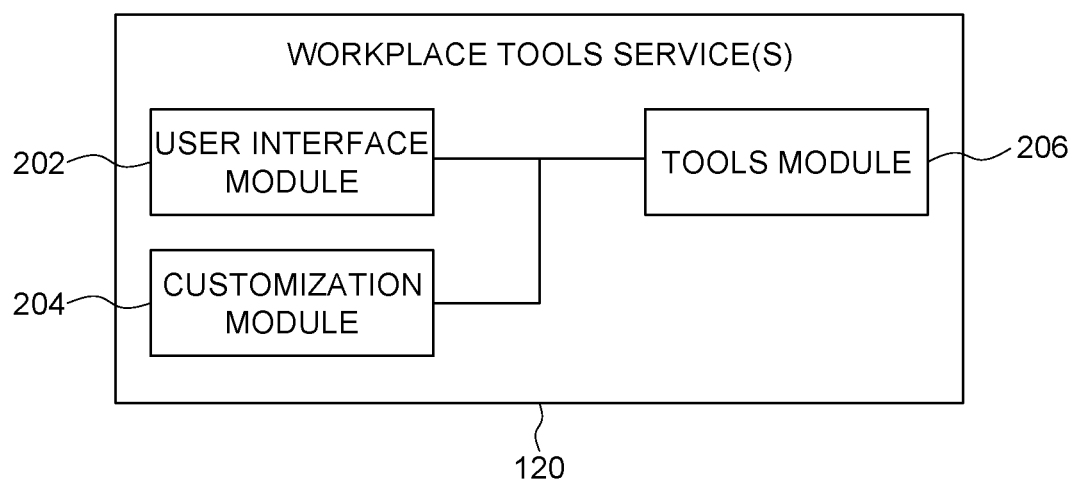
FIG. 2 is a block diagram illustrating example modules of the workplace tools service(s) of FIG. 1.

FIG. 2 is a block diagram illustrating example modules of the workplace tools service(s) 120. A user interface module 202 is configured to generate user interfaces for dynamically modifying employee data using workplace tools, as described or shown herein. A customization module 204 is configured to customize the generated user interfaces (e.g., based on employee identification, role, and/or tasks), as described or shown herein. A tools module 206 is configured to surface functionality of one or more workplace tools within one or more customized user interfaces (e.g., by providing dynamically activatable links within the user interface), as described or shown herein.

Let's consider the workplace tools from a user perspective, such as from the perspective of an employee, service provider, or customer of an entity, such as a business organization. The improved user interface functionality described and/or illustrated herein is configured to put workplace tools at your fingertips to help you take action quickly and keep moving. In example embodiments, the focus is to reduce clutter, allowing you to easily find the things that matter most for your workflow, including on devices with small screens, such as mobile devices (e.g., mobile phones). Move from one task to the next with exactly the information you need to help you accomplish what you came to do.

Whether you use the networked system 102 to plan your next 1:1, send feedback, or fill out your review, an access point, such as a Home page, is your basecamp to easily set off in any direction.

Similar to the Home page, Discovery Navigation surfaces the information and workflows for quick navigating through the workplace tools environment.

The Discovery Navigation is your directory for information about you, your team, and your company. The disclosed user interface (e.g., "Elevated Design") gives every user easy access to exactly the tools they need so they can dive in and explore deeper functionality whenever they'd like.

A People tab highlights the people you're connected and work closest with. The People tab centers a set of the workplace tools within the context of the people connected to you—your 1:1 s, feedback you've shared, and more. Tools within the workplace environment may be important, but what may be more important is how those tools are used in relation to your teammates. The People tab is where you find those answers and see how you and your colleagues are empowering each others' performance story.

Your personal performance story is greater than the sum of its parts. The workplace tools are presented in context with each other and to empower you on your performance.

A Performance Toolkit brings together the key tools around performance management, making it easy for you to see your work in context and take control of your career path.

Everything from Reviews to tools for managing 1:1 s and tools for managing employee growth are brought together to give you a complete picture of what you've done and where you're headed. Everything you need to see and understand your performance story is available at your fingertips.

A user interface should be easy to use, but its value may also be realized in its ability to deliver the right outcomes. For managers, that may mean building a high-performing team that drives results. The tools managers rely on should share that responsibility, or else those tools won't serve the purpose they're intended to accomplish.

The Elevated Design is configured to provide a customized and personalized experience for managers. The My Team page is not just about what managers need to do, like plan their 1:1 s and review updates, but also refocusing on what's most important: e.g., your direct reports. It allows managers to succeed at managing and continuing conversations beyond 1:1 s (e.g., by presenting a dashboard for their team's performance, sentiment over time, and encouraging actions—e.g., through activatable user interface elements for invoking one or more functions of one or more workplace tools—where they can support more).

With the disclosed user interfaces for more quickly and easily accessing workplace tools in contexts where they are needed, managers can take proactive steps to support their direct reports and become the leaders their team needs them to be.

Design Principles

Action over discovery: People come into the workplace tools environment to do a thing, not stick around and explore. The concept of a passive event timeline has been killed in favor of action-oriented information displays (e.g., including activatable user interface elements for invoking one or more functions of workplace tools to, for example, easily and quickly modify employee data in one or more specific contexts).

People over tools: Employees don't care about a tool named "1:1 s"; they just know their manager wants to know what's going on and how best to support them. While sometimes harder to design for, it makes more intuitive sense to an employee that doesn't care about HR jargon.

Managers are the lever: Employees will jump through the hoops to get praise, promotions, and pay increases. The manager's understanding and ability to get value out of a tool directly affects employee participation. If your manager likes it, you'll use it. As described or shown herein, Elevated Design specifically prioritizes manager experience in some areas.

Meet employees where they work: Creating Slack/MS Teams, mobile, email interactions when appropriate instead of forcing users to log into the app. The system is configured to care about the collection of inputs over the medium to entry.

Start with an opinion: While the workplace tools environment may need to be flexible it should also be opinionated. Each tool is configured to wade through these challenges differently and end up on different ends of the spectrum. Users may just stick to workplace tools defaults if they're reasonable.

Top-Level Navigation

Figure 3:
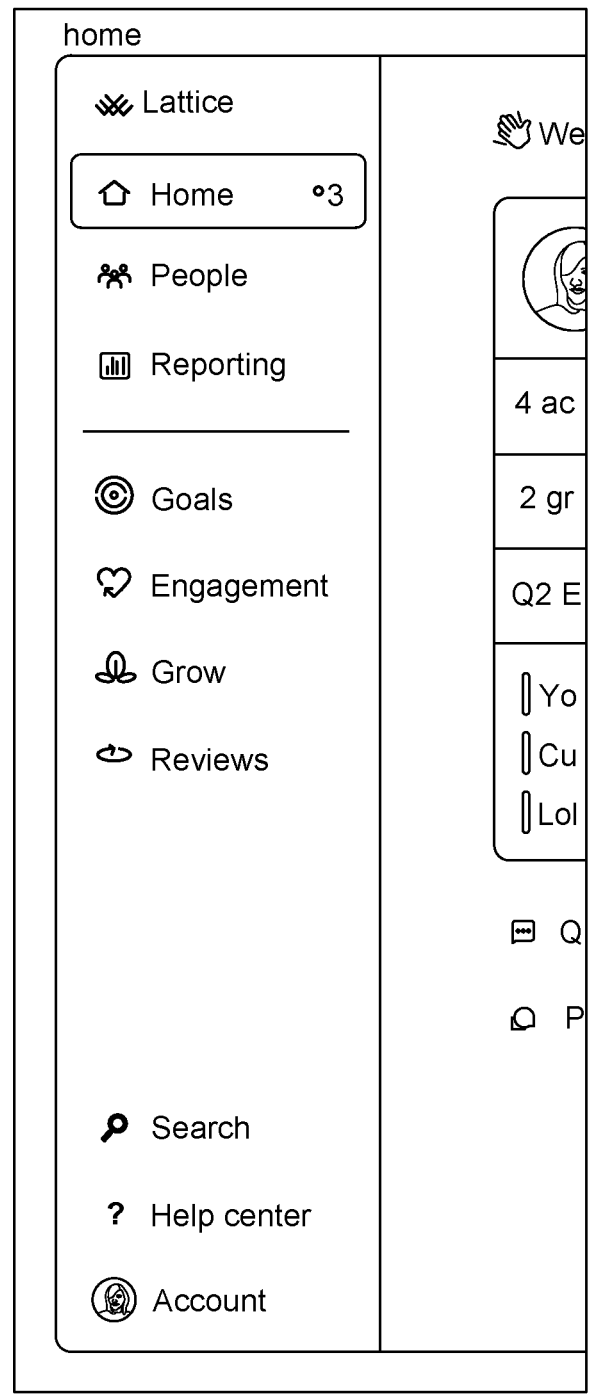
FIG. 3 is a screenshot depicting an example navigation bar or main menu.

FIG. 3 is a screenshot depicting an example navigation bar or main menu 300 of the disclosed workplace tools and data navigation system (e.g., networked system 102). Described below are some the navigation items that may be nestled into the dark primary navigation bar.

Home: Jumping off point. It's meant to be the place to see tasks requested of you and quickly complete the workflow you logged in to complete Action over discovery.

People: Providing access top workplace tools and dynamic modification of associated data through the lens of people you interact most with. There is sometimes very little reason to interact with people outside of your manager, direct reports, or direct relationships usually captured in 1:1 s. As shown, the system has de-prioritized discovery and focused on getting you current (e.g., real-time) info and actions quickly.

Reporting: As a manager you will see this option to review data about the people in your purview. In example embodiments, this is kept as a separate page instead of distributing reporting views to respective product pages because this will allow us to tell a bigger story in the future. Single product reporting is surface level but correlated reports become powerful and actionable. For example comparing tenure to key performance indicators. This standalone page is ripe for the Analytics pod to define and carry forward.

Products: Top level product pages are not necessary for all products but they are away to view concepts that are not people first. For example, Goals are an object on their own that you may want to traverse via the goals explorer and people are just an attribute of a goal and may not be your main focus. A top level Goals page allows us to view important information from an alternate perspective.

In example embodiments, top level pages will not be viewable by everyone. It's okay to allow some of them to be role specific (e.g., accessible only to users that have been assigned to certain roles). Only show information publicly if it is truly helpful. In example embodiments, most users may come in here to do a job, not to discover new information.

In example embodiments, not every tool needs a top-level page. If the product is better served in a people first concept (like 1:1 s) it may not need to have a top level page.

Secondary Navigation

Figure 4:
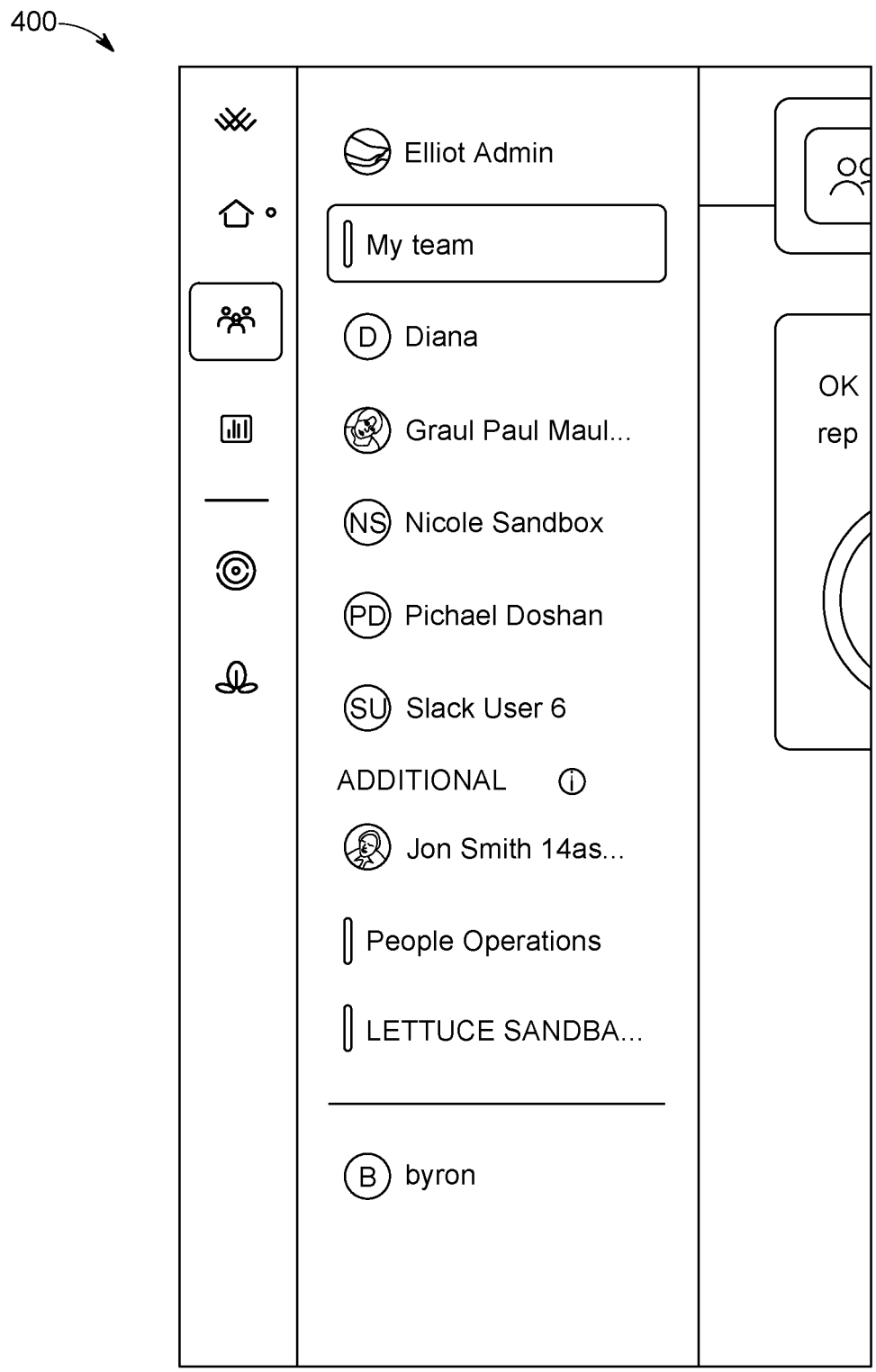
FIG. 4 is a screenshot depicting an example secondary navigation bar (e.g., for when Teams are selected from the main menu).

FIG. 4 is a screenshot depicting an example secondary navigation bar 400 (e.g., for when Teams are selected from the main menu). As shown, the secondary navigation bar corresponding to the Teams category may include a top-level menu item for accessing a page for "My team" (e.g., one of a set of teams to which the user belongs) and sub-menu items for accessing pages corresponding to various members of the team. In example embodiments, the sub-menu items may be sorted by connection strength (e.g., most interacted with by the user and/or most closely related to the user based on one or more attributes of the user). Other top-level menu items may include "People Operations" (e.g., for accessing a page having workplace tools for editing data for team members in real-time), and/or links to one or more message boards or other communication channels, such as Slack channels (e.g., LETTUCE SANDBA . . . ) associated with the set of teams.

Figure 5:
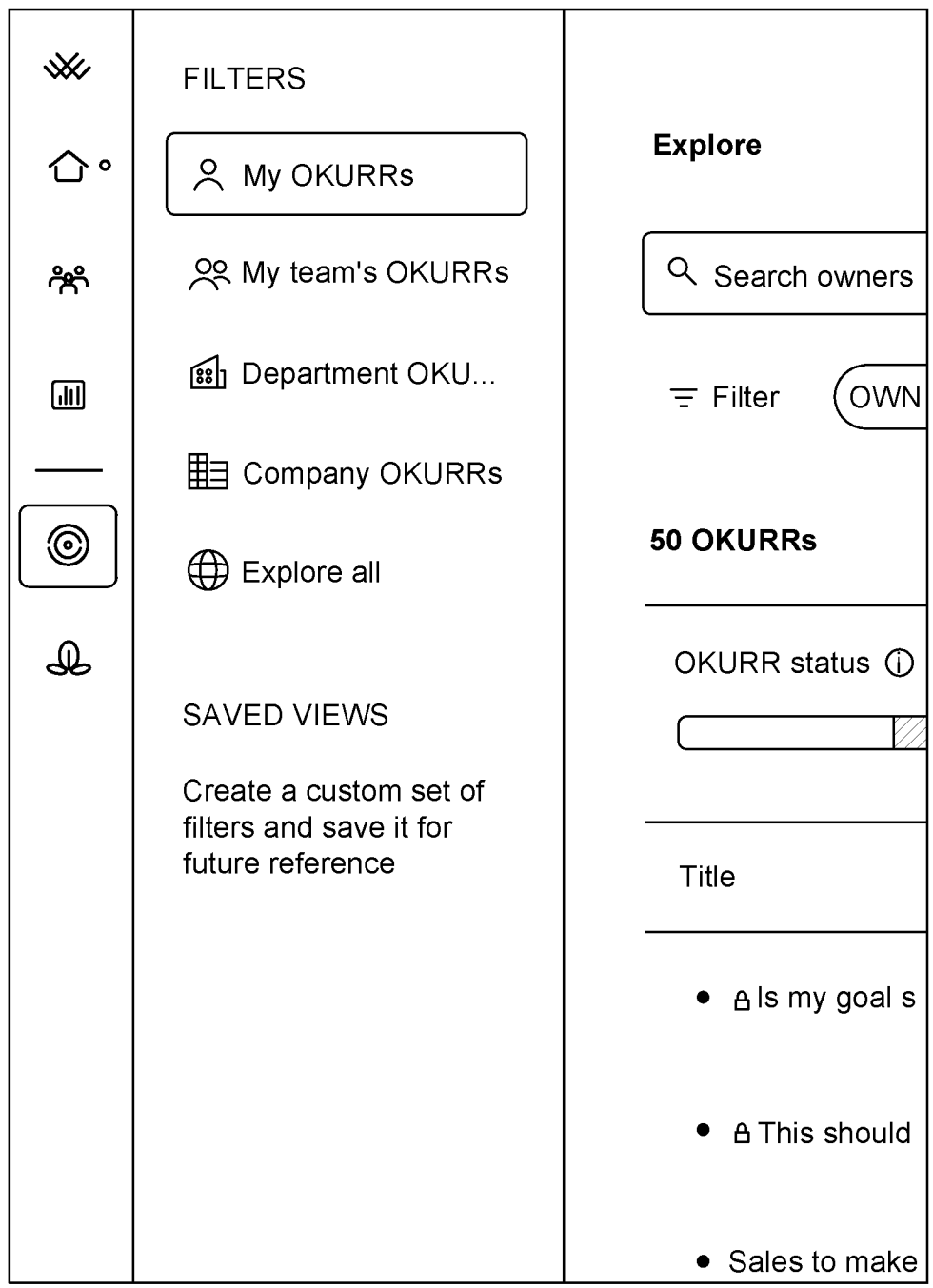
FIG. 5 is a screenshot depicting an additional example secondary navigation bar (e.g., for when Goals are selected from the main menu).

FIG. 5 is a screenshot depicting an additional example secondary navigation bar 500 (e.g., for when Goals are selected from the main menu). As shown, the secondary navigation bar corresponding to the Goals category may include filters for OKURRs (e.g., including OKRs, targets, or goals) for the user, such as filters for the user's OKURRs, the team's OKURRs, the department OKURs, and the company OKURRs. Selection of one of these filters from the navigation menu may cause the results in the corresponding view (e.g., an Exploration view shown in one or more of the display areas) to be filtered accordingly. In example embodiments, the user may create and/or save one or more filters corresponding to the view from the secondary navigation bar and/or access one or more of the set of saved filters from the secondary navigation bar.

In example embodiments, the secondary navigation bar (e.g., in gray color) is presented after a selection from the main menu (e.g., in dark primary color). In example embodiments, the secondary navigation bar may be the same size in all pages, respect the same responsive rules, and/or include expand/collapse logic.

People first: Inside of the People top level nav item is the secondary people nav. It's based on the people and groups that you interact with the most. This was crafted to prioritize managers moving quickly through direct report relationships. Individual Contributor (IC) employees may get some value from moving quickly through people but they largely interact with their manager the most and this design is configured to provide interacting with groups as a big opportunity (company, department, pod).

Non-people first: For all other top level nav items the secondary nav can be used for navigation sub-pages (e.g. Admin) or changing filters (e.g. Goals).

Home Page

FIG. 6 is a screenshot depicting an example Home page 600. In example embodiments, the Home page may include one or more of the following:

Profile card: You already know who you are; you don't need the system to tell you. While seeing your name and picture helps ground the experience, the profile card is meant to orient you by giving you a peak of what you own but not focusing on what you already know. In example embodiments, the profile card may include one or more user interface elements for accessing workplace functions corresponding to active goals, growth areas, engagement surveys, feedback, or 1:1 s. For example, from the Profile card, the user may click one or more user interface elements to view and/or respond to an employer engagement survey (e.g., "View results"), give feedback, plan 1:1 s, and so on.

Tasks: Debatably the most important thing employee will interact with. In example embodiments, this is high on the hierarchy since it's the main driver for coming into the workplace tools environment. Annoying or irrelevant tasks may erode trust and make you ignore tasks altogether. Most if not all tasks have an expiration date to not clutter feeds and an audit for low priority tasks may be performed at a configurable interval to either make them short lived or easy to decline. As shown, the Tasks workplace tool may provide functions for writing a review, reviewing your team's updates, or writing your weekly update, each of which is accessible to the user from the Tasks view via one or more interactive user interface elements. Additionally, the Tasks view may provide access to Calendar functions to, for example, reschedule upcoming meetings.

Upcoming: High frequency touch points like 1:1 s and updates are time-specific and are thus showing chronologically connected. This feature is configured to be expandable to describe key events in reviews and surveys.

Quick actions: Users appreciate the quick actions, such as user interface elements for invoking workplace tools to provide feedback, that are discoverable flat in the page (e.g., in one or more of the display areas).

Profile Page

Figure 7:
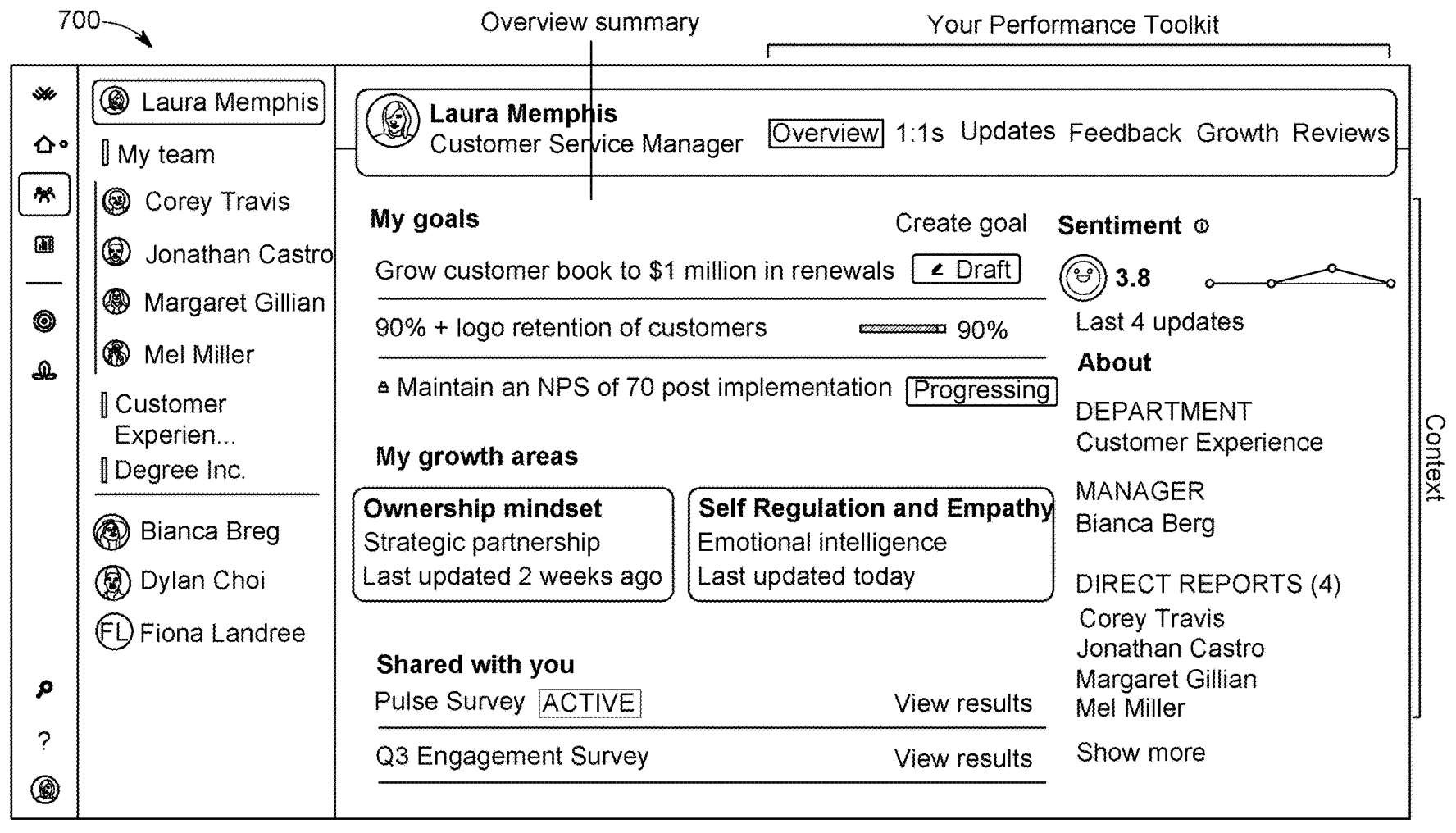

FIG. 7 is a screenshot depicting an example Profile page. In example embodiments, the Profile page may include one or more of the following:

Overview summary: This section provides a summary of the things you are responsible for, such as goals, growth areas, and so on. User interface elements may be provided to access tools associated with each item, such as a "Create goal" link to access a Goals tool to draft or modify goals. Growth areas may include one more activatable user interface elements corresponding to functions of one of more Growth tools, such as tools for advancing an "Ownership mindset" or for "Self-Regulation and Empathy," which may navigate to pages for making or updating Growth progress.

Context: Personal sentiment and key attributes are displayed and below the "show more" a user will see their custom attributes. Some attributes with varying visibility will show locks and info icons to describe their unique nature.

Product (e.g., workplace tools) tabs: Each product described on the tabs at the top is based on the perspective of the profile you're on. For example, it's either my own list of 1:1 s or the 1:1 I have with the person I'm viewing.

Group Page (Dept, Company)

Organized very similarly to a people profile page except through the lens of a larger group. In example embodiments, these options are placed in the secondary people nav to set up for what's next with groups in the workplace tools environment flow and to enable more discovery.

Settings

Figure 8:
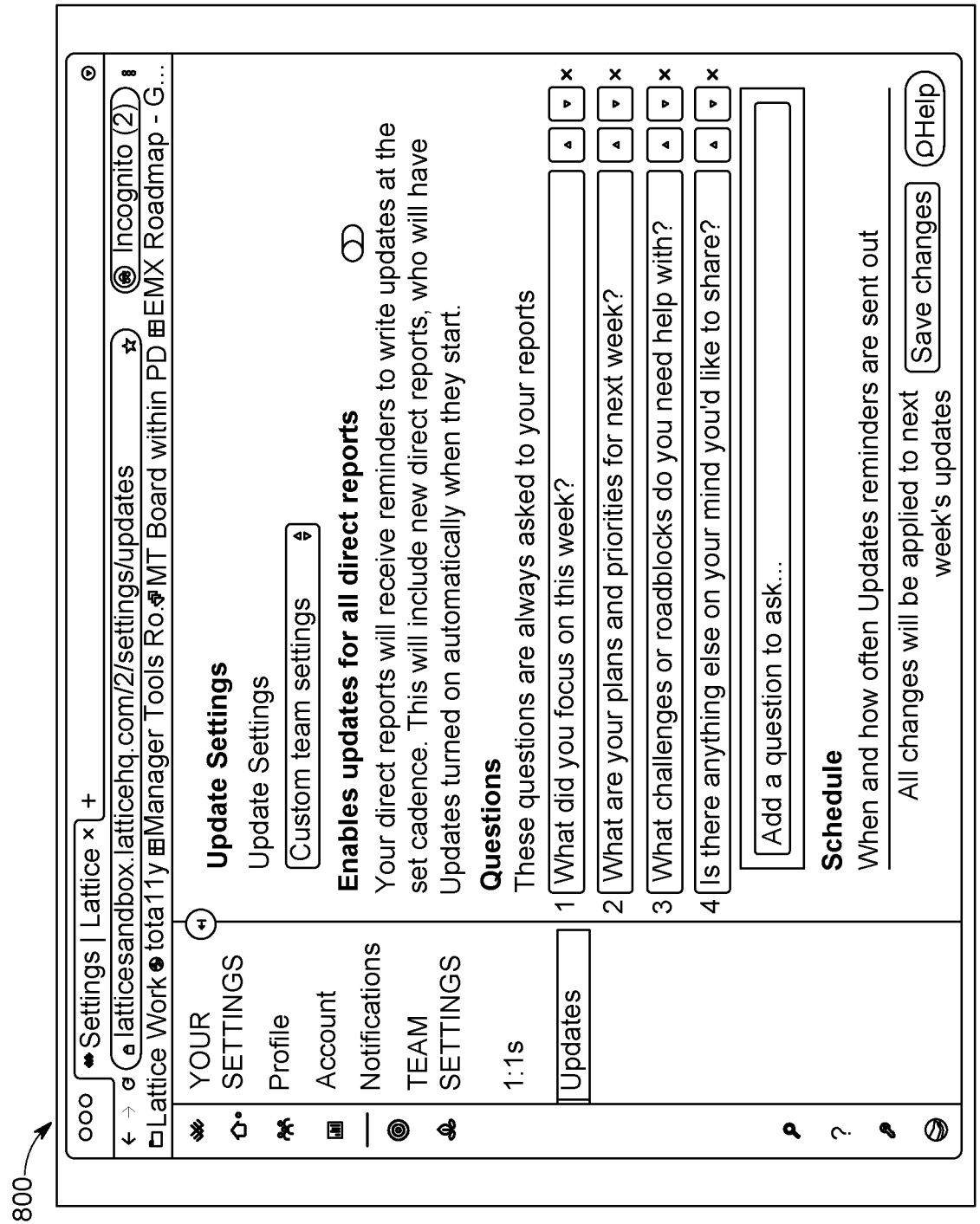
FIG. 8 is a screenshot depicting an example Settings page.

FIG. 8 is a screenshot depicting an example Settings page. In example embodiments, Personal profile settings and team settings live in this "Manage settings" action under your profile in the bottom left of the primary nav. Part of the pain is how you enter and then exit and get back to what you were doing; therefore, these settings are close to your profile page and my team page.

Top Level Product Page (E.G. Goals)

Figure 9:
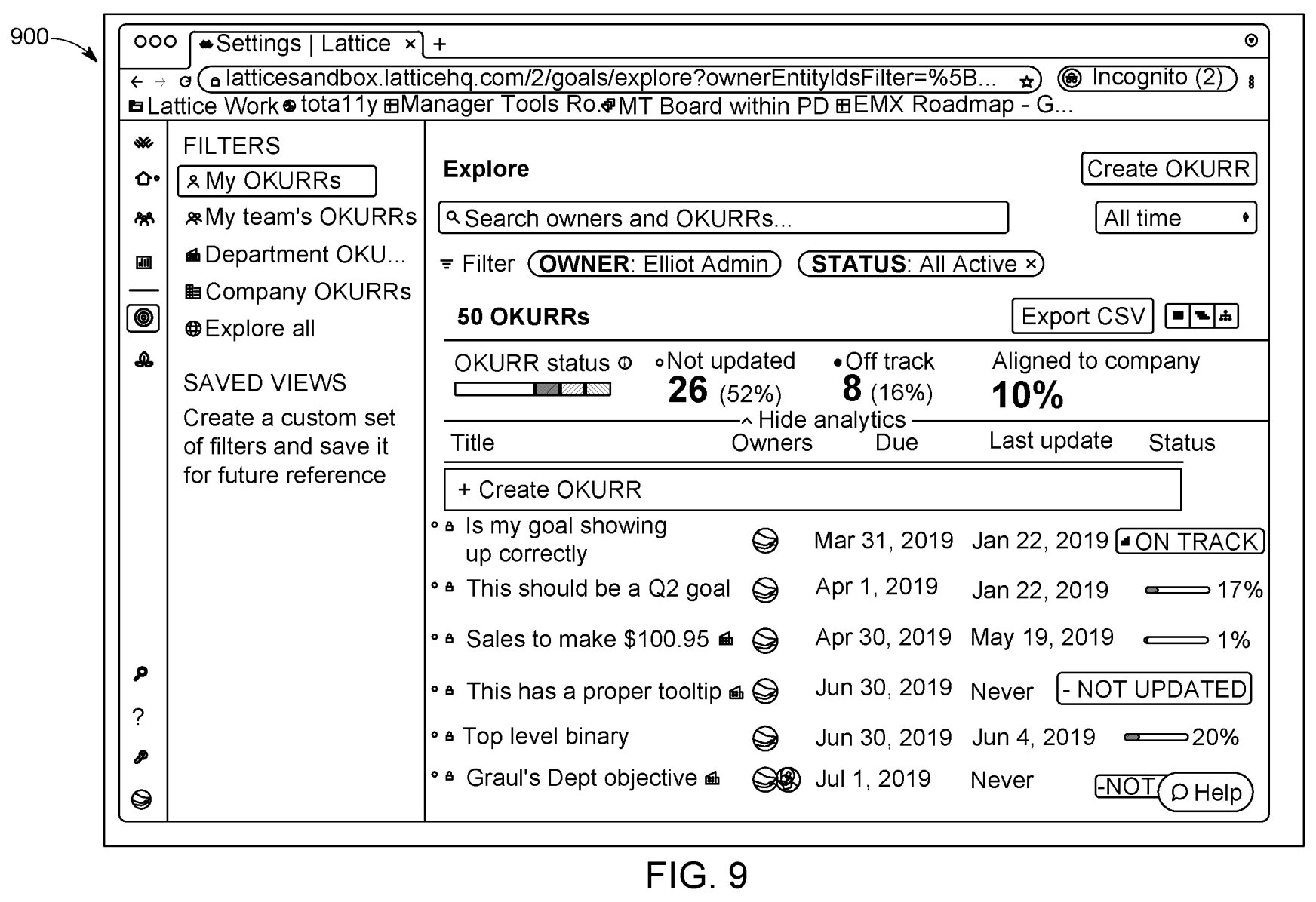

FIG. 9 is a screenshot depicting an example exploration page. Here, "OKURRs" (e.g., Objective and Key Results (OKRs), goals, and/or targets) and other identified or selected data items may be filtered by employee, team, department, or company (e.g., via the secondary collapsible panel), searched for, and modified. Additionally, data pertaining to statuses of the selected and/or filtered OKURRs may be presented for editing in real-time, included whether they are updated, off track, and/or aligned to the company.

Figure 10A:
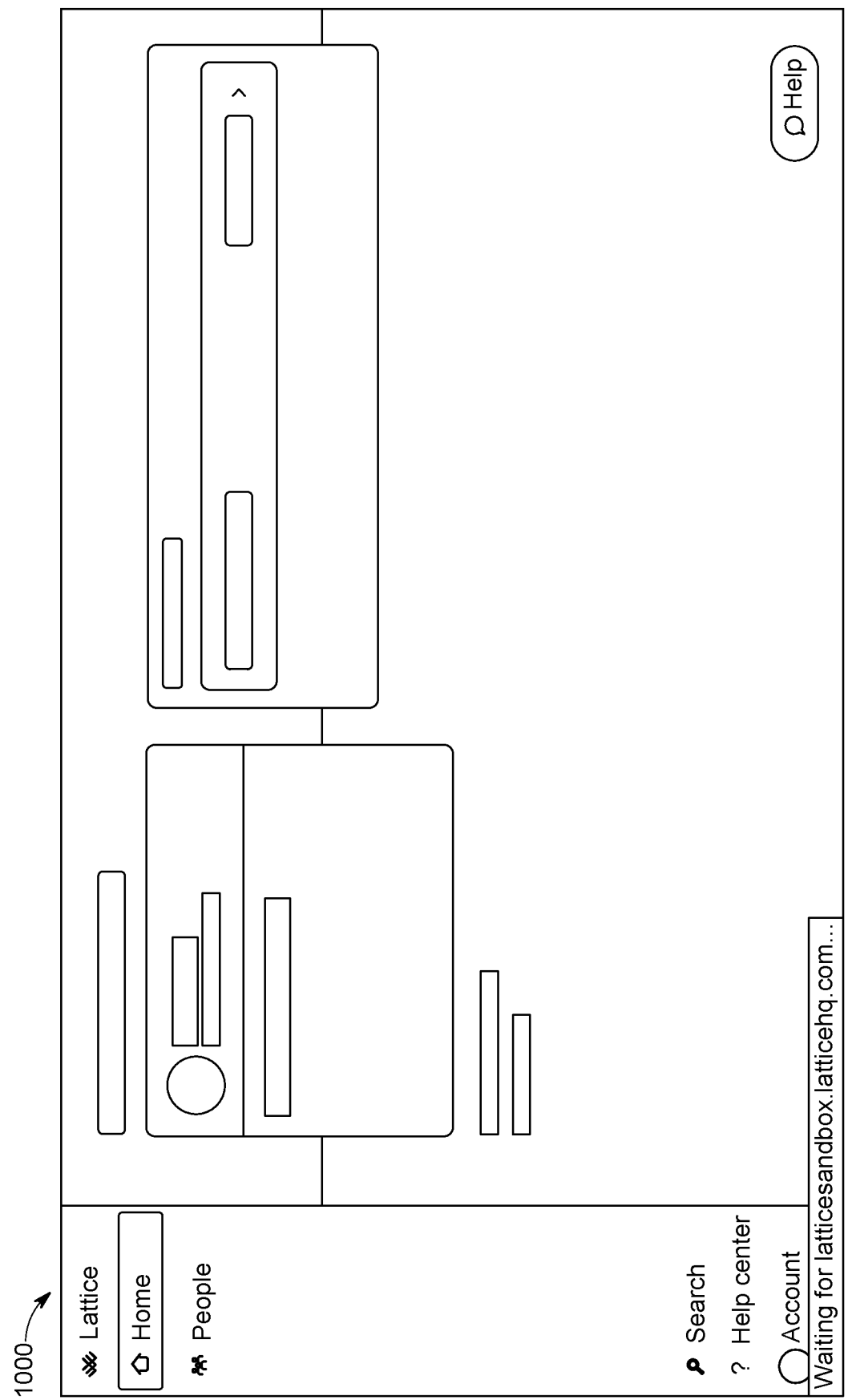
Figure 10C:
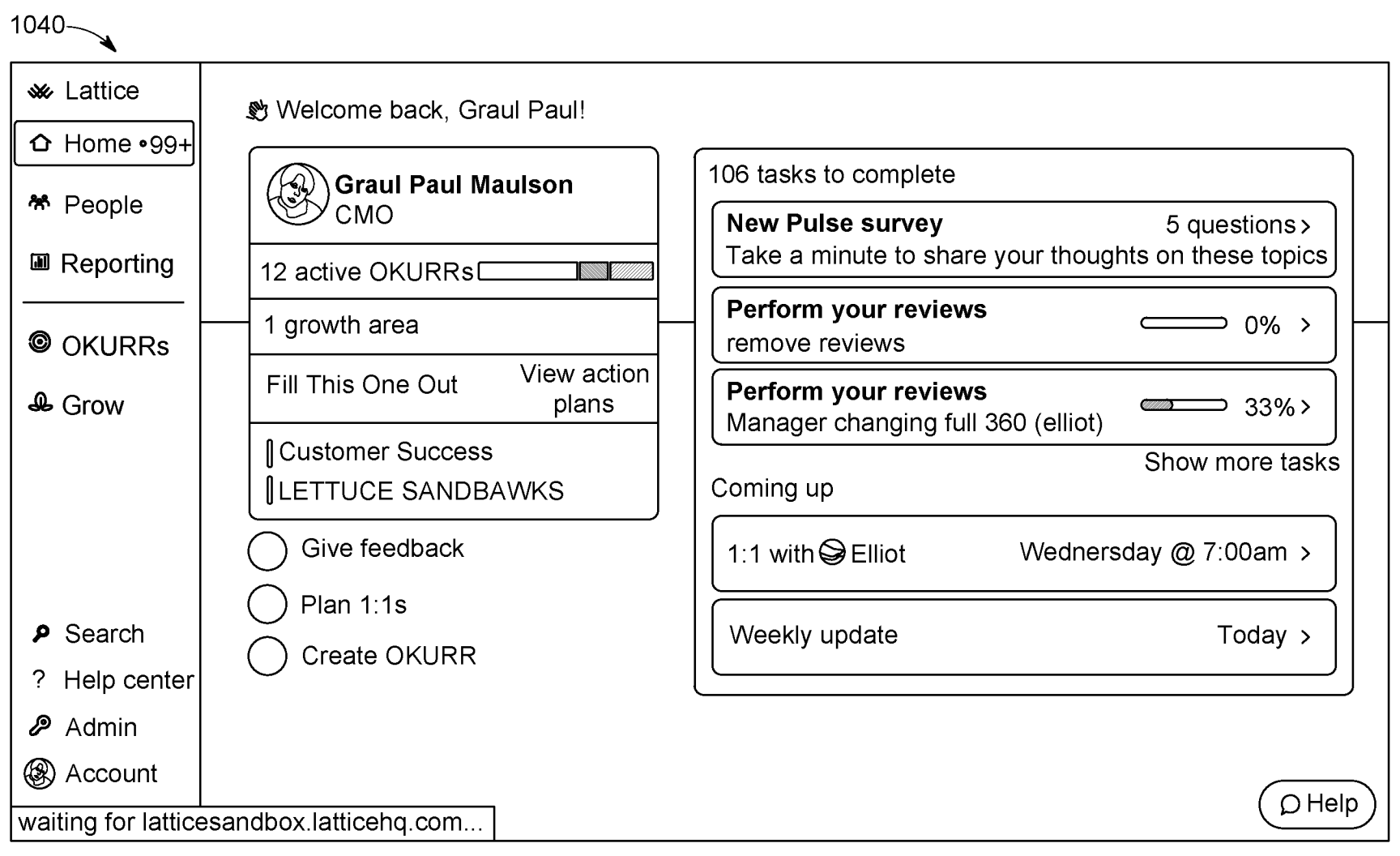

FIGS. 10A-10C are screenshots depicting an example of rendering of a page in stages based on an application of one or more loading optimizations. As shown in FIG. 10A, at a first stage 1000 of the rendering, an outline of the content areas to be displayed is rendered as a first set of data is loaded from the database. As shown in FIG. 10B, at a second stage 1020 of the rendering some of the content areas are filled in as an additional set of data is loaded from the database. In example embodiments, a graphic (e.g., an animated icon, such as a spinner or turning circle) is used to indicate display areas for which data is still being loaded. As shown in FIG. 10C, the page 1040 is fully rendered as soon as all of the remaining data has been loaded. In example embodiments, the order in which the data items are rendered in the page is based on how quickly they are retrieved or likely to be retrieved from a database (e.g., the workplace tools database). In example embodiments, the user interface may be generated from one or more user interface templates or schematics that define the stages of the rendering process and/or associate particular data items with particular stages.

Figure 11A:
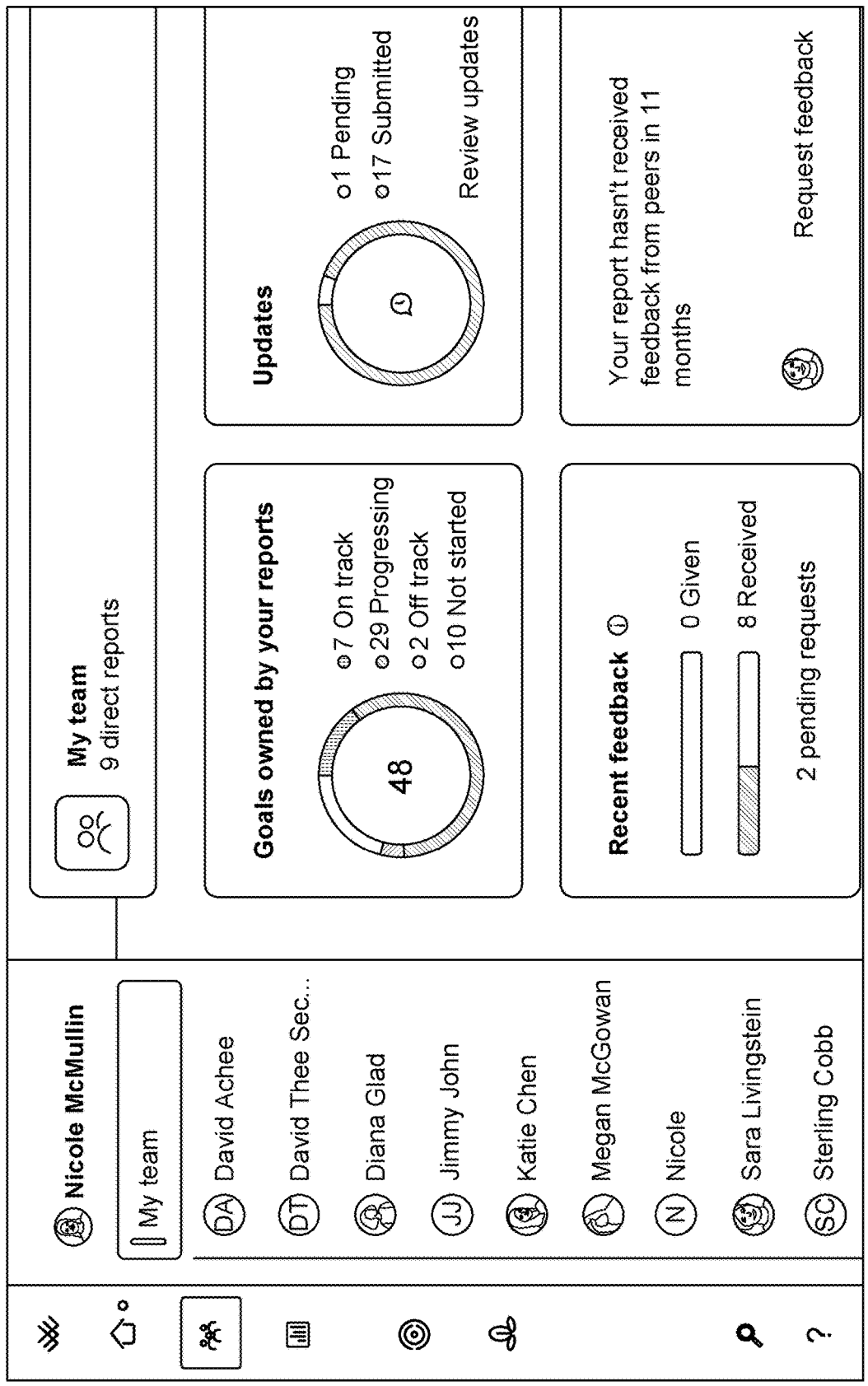
FIGS. 11A and 11B are screenshots depicting an example collapsible panel.
Figure 11B:
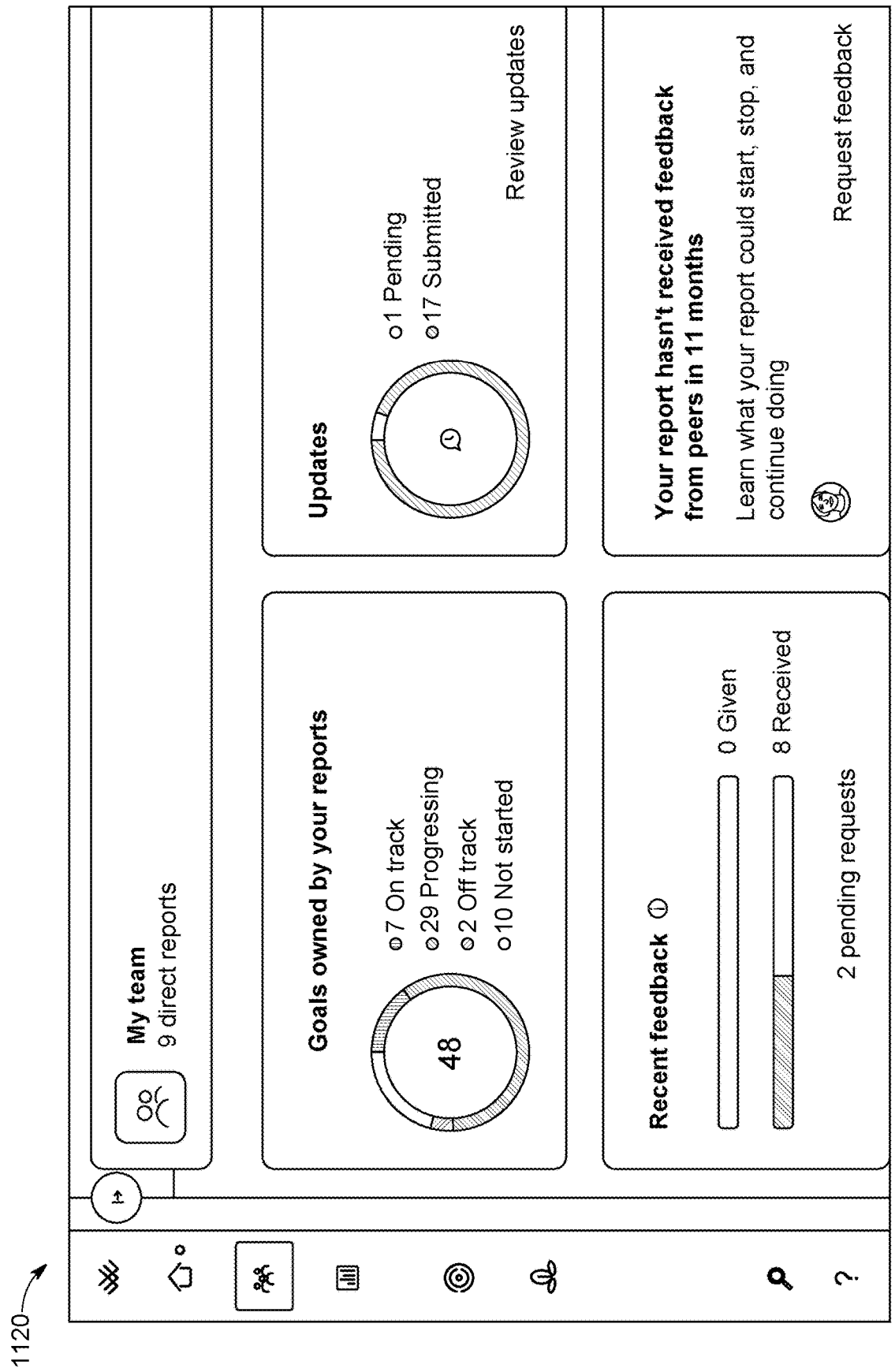

FIGS. 11A and 11B are screenshots depicting an example collapsible panel. As shown in FIG. 11A, the collapsible panel 1100 is rendered (e.g., when a menu items, such as the Teams menu item, is selected from the main menu). As shown in FIG. 11B, the collapsible panel 1120 is collapsed (e.g., upon activation of a user interface element or clicking on a particular region, such as at the borders, of the collapsible panel. A user interface element may designate that the panel has been collapsed. In example embodiments, a user interface element (e.g., an arrow) may be activatable to restore (e.g., un-collapse) the panel. In example embodiments, collapsing the panel causes the display areas to expand such that the fill the space that was previously occupied by the collapsible panel. In this way, the display areas may be easier to view and navigate on devices with relatively small screens, such as on mobile phones or other small devices.

Example Mobile Device

Figure 12:
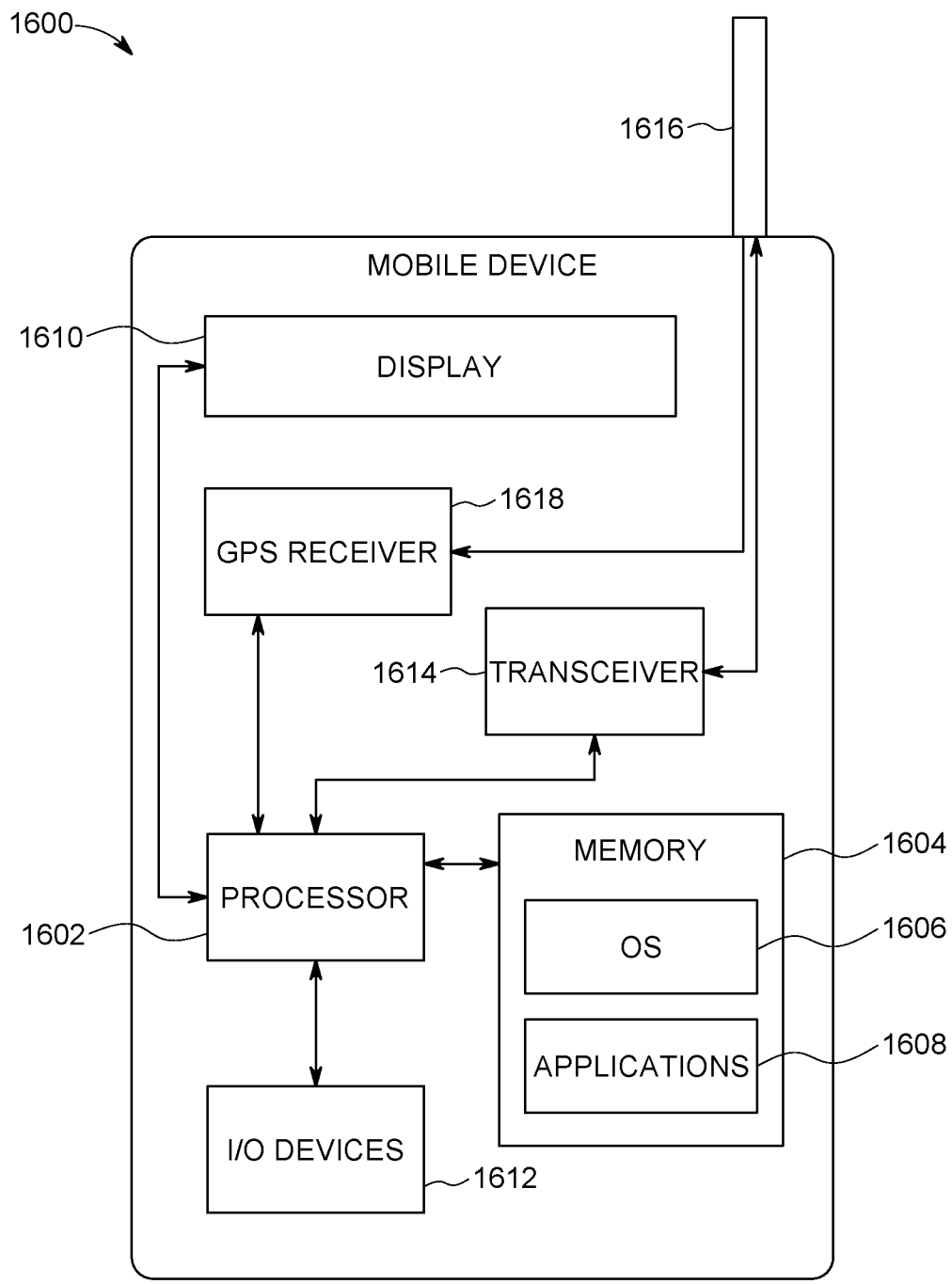
FIG. 12 is a block diagram illustrating a mobile device, according to an example embodiment.

FIG. 12 is a block diagram illustrating a mobile device 1600, according to an example embodiment. The mobile device 1600 can include a processor 1602. The processor 1602 can be any of a variety of different types of commercially available processors suitable for mobile devices 1600 (for example, an XScale architecture microprocessor, a Microprocessor without Interlocked Pipeline Stages (MIPS) architecture processor, or another type of processor). A memory 1604, such as a random access memory (RAM), a Flash memory, or other type of memory, is typically accessible to the processor 1602. The memory 1604 can be adapted to store an operating system (OS) 1606, as well as application programs 1608, such as a mobile location-enabled application that can provide location-based services (LBSs) to a user. The processor 1602 can be coupled, either directly or via appropriate intermediary hardware, to a display 1610 and to one or more input/output (I/O) devices 1612, such as a keypad, a touch panel sensor, a microphone, and the like. Similarly, in some embodiments, the processor 1602 can be coupled to a transceiver 1614 that interfaces with an antenna 1616. The transceiver 1614 can be configured to both transmit and receive cellular network signals, wireless data signals, or other types of signals via the antenna 1616, depending on the nature of the mobile device 1600. Further, in some configurations, a GPS receiver 1618 can also make use of the antenna 1616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 13:
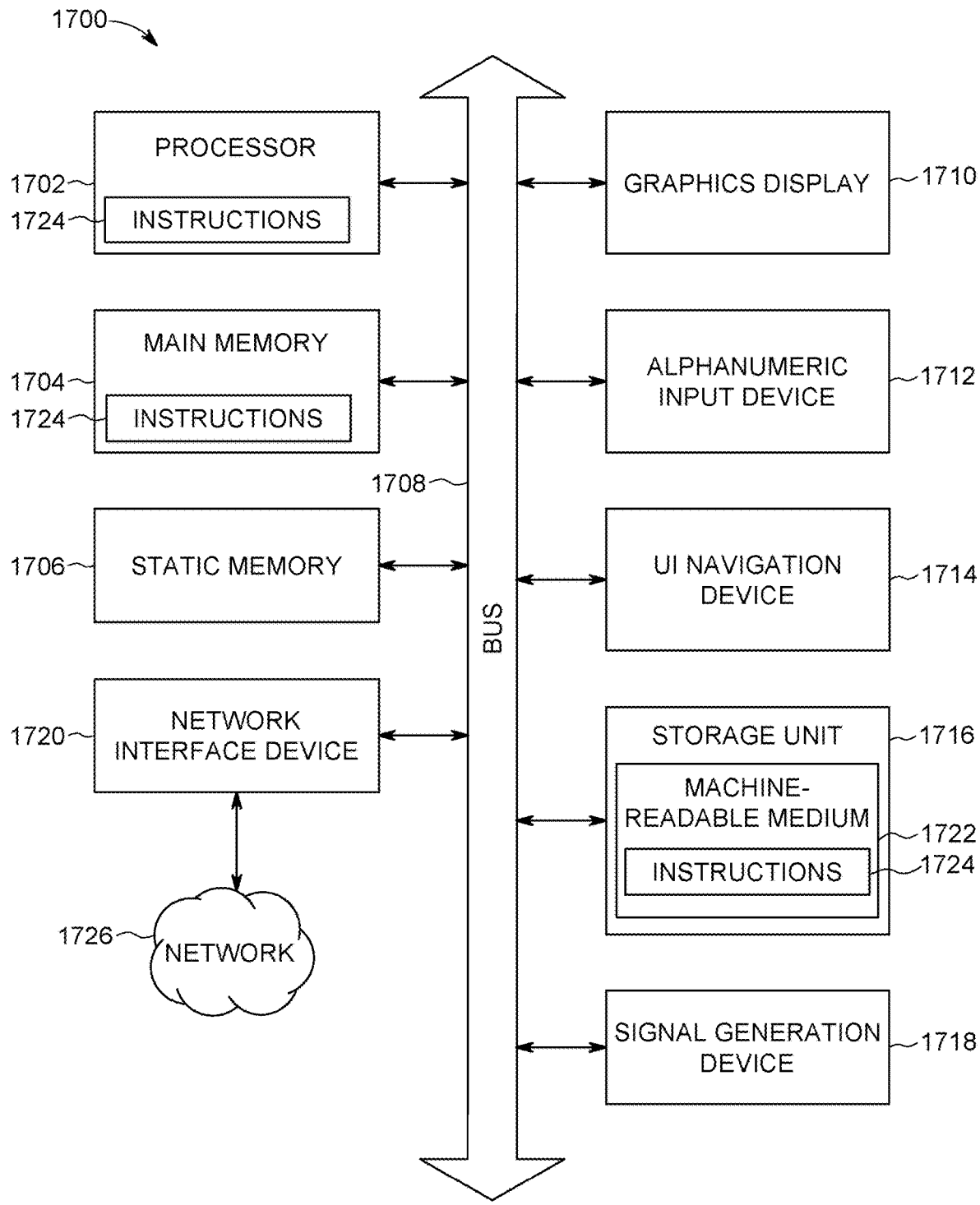
FIG. 13 is a block diagram of a machine in the example form of a computer system within which instructions for causing the machine to perform any one or more of the methodologies discussed herein may be executed.
Figure 15:
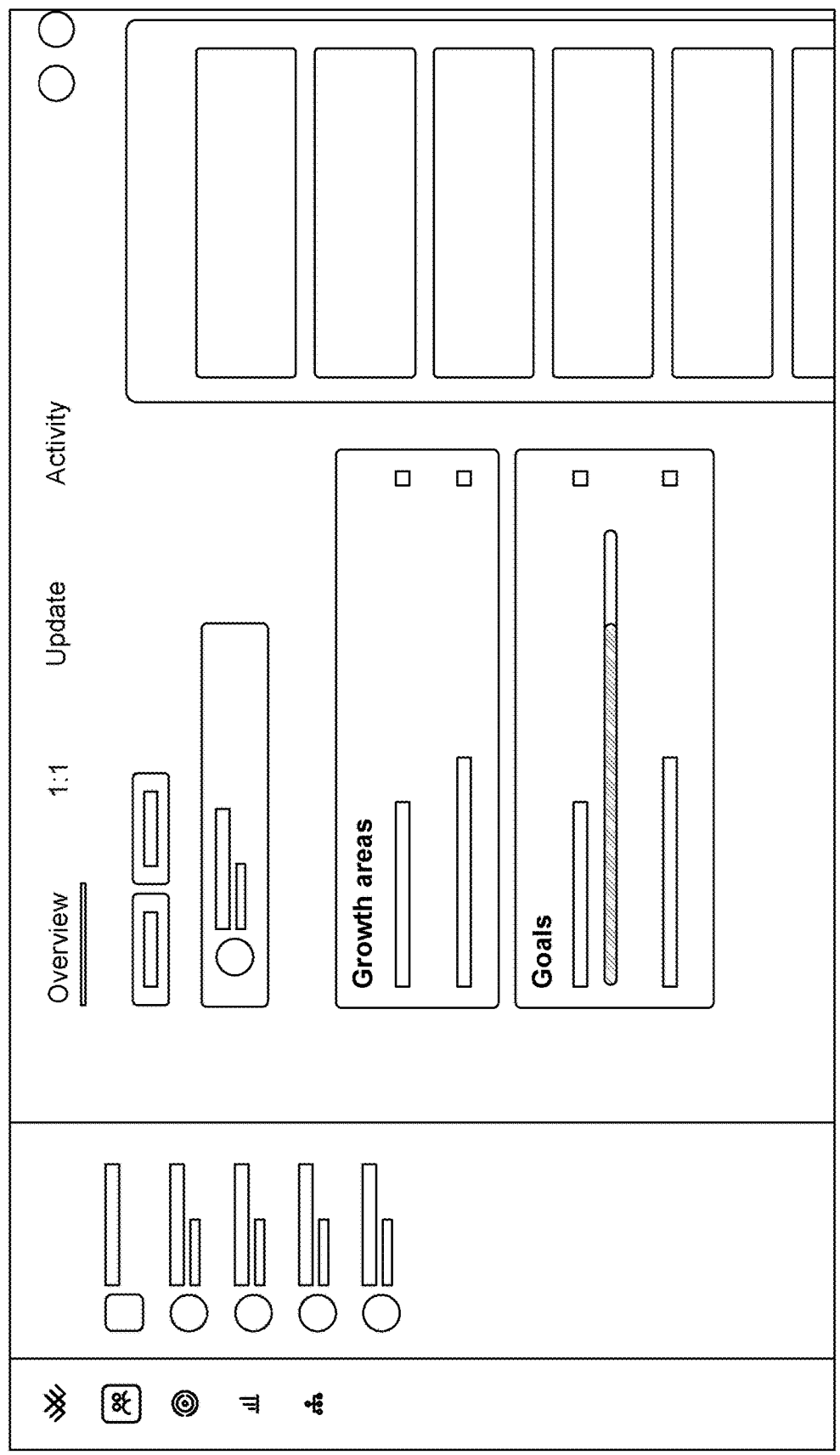
Figure 16:
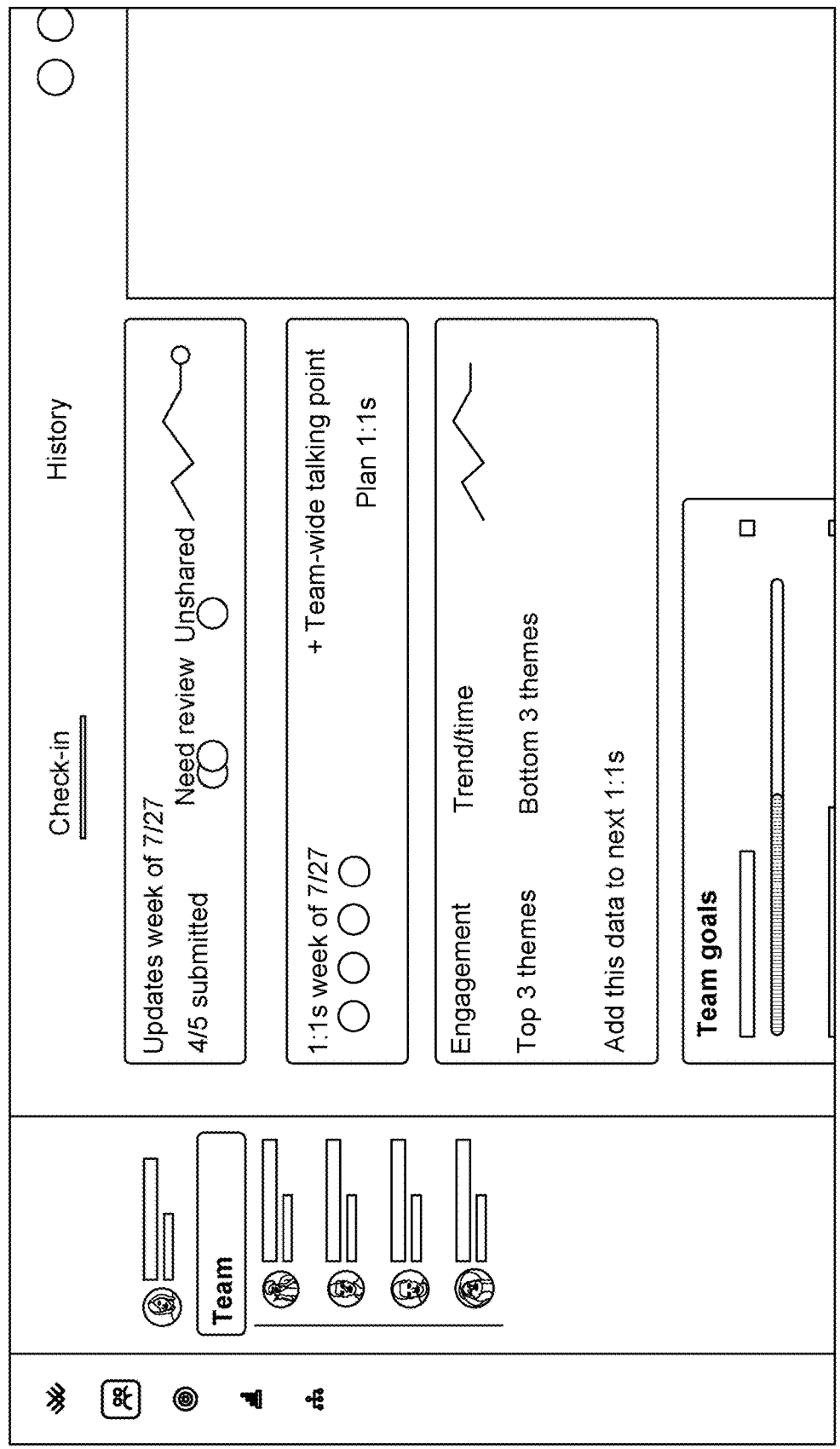
Figure 17:
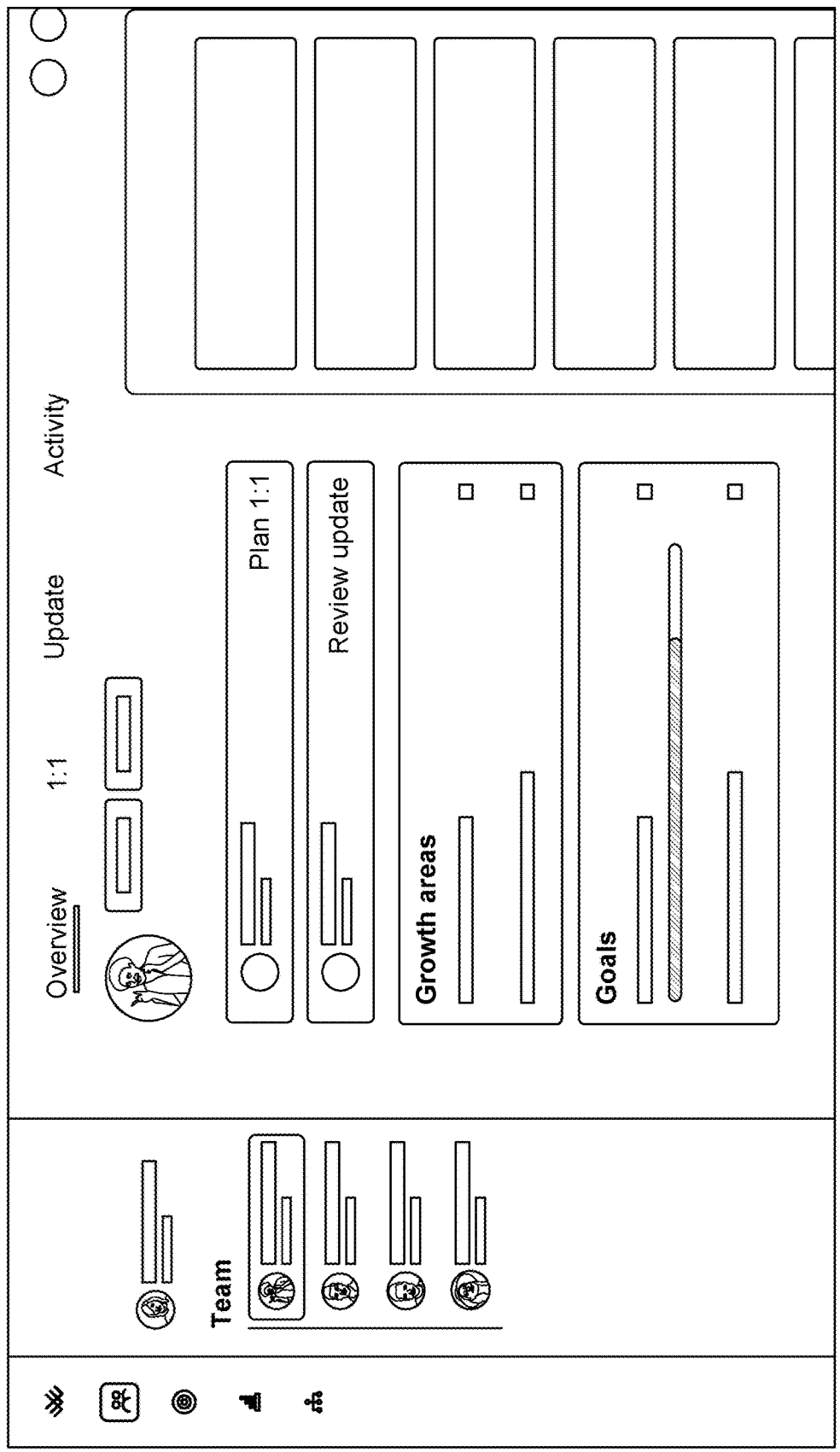
Figure 18:
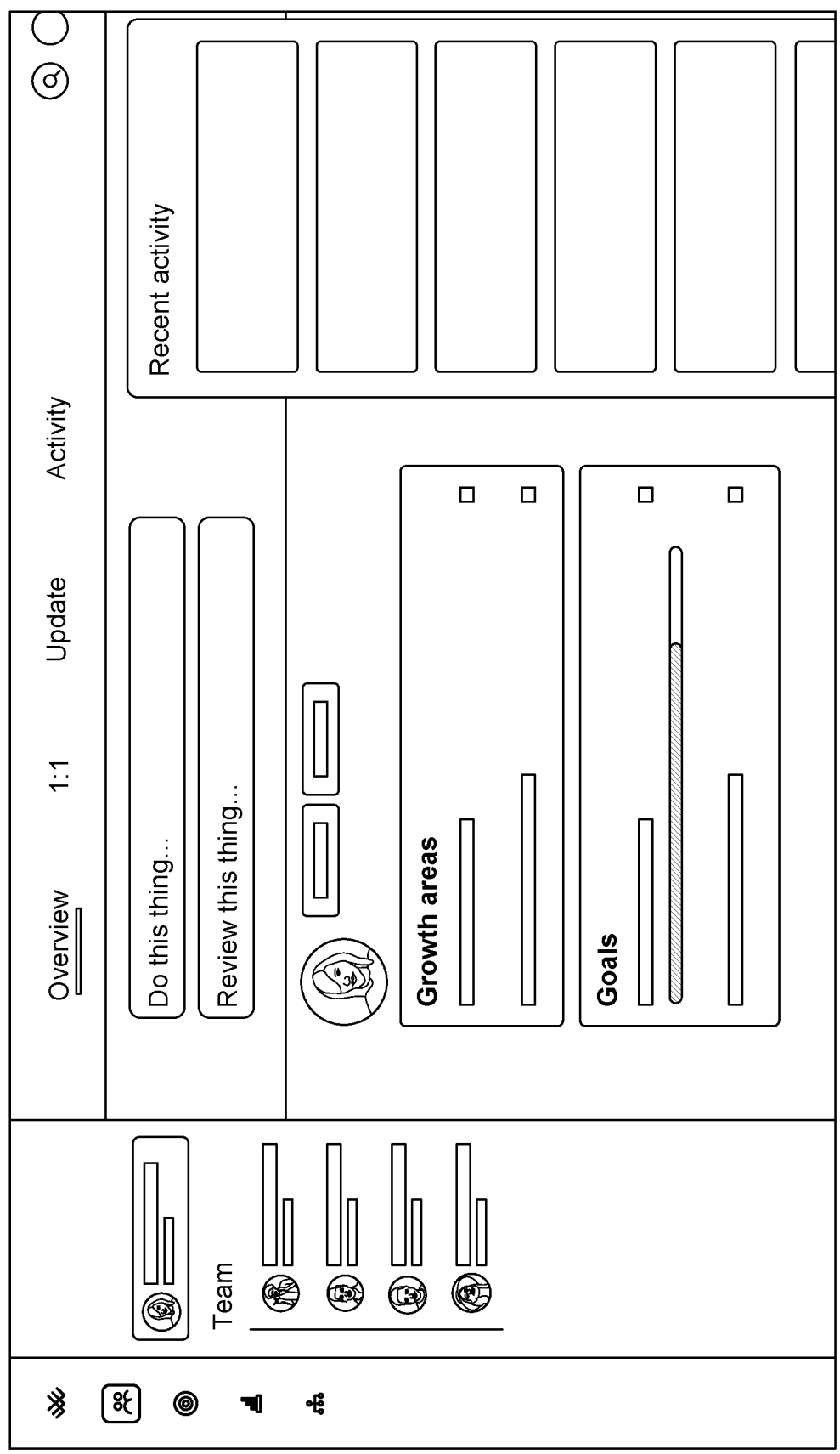
Figure 19:
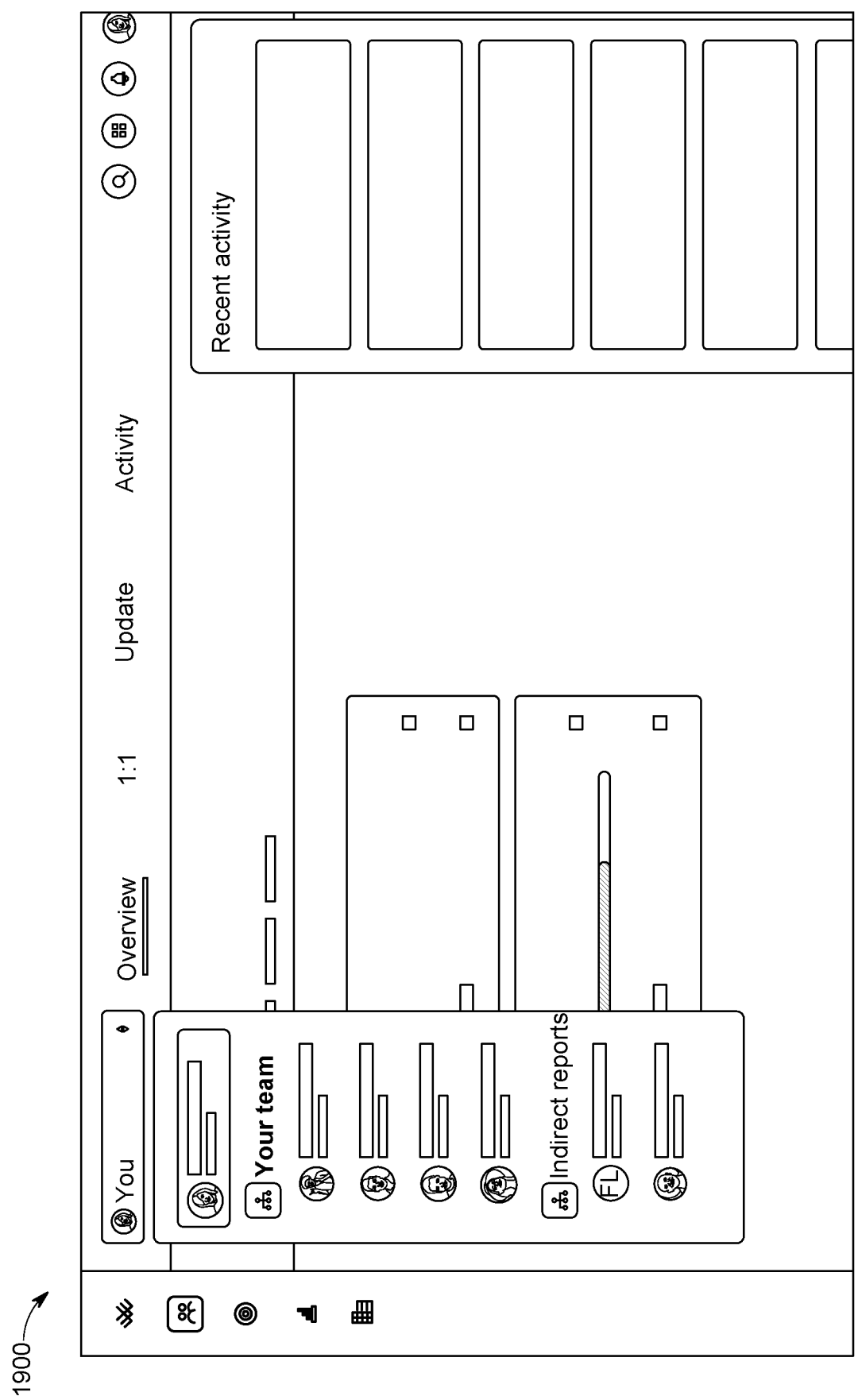
Figure 20:
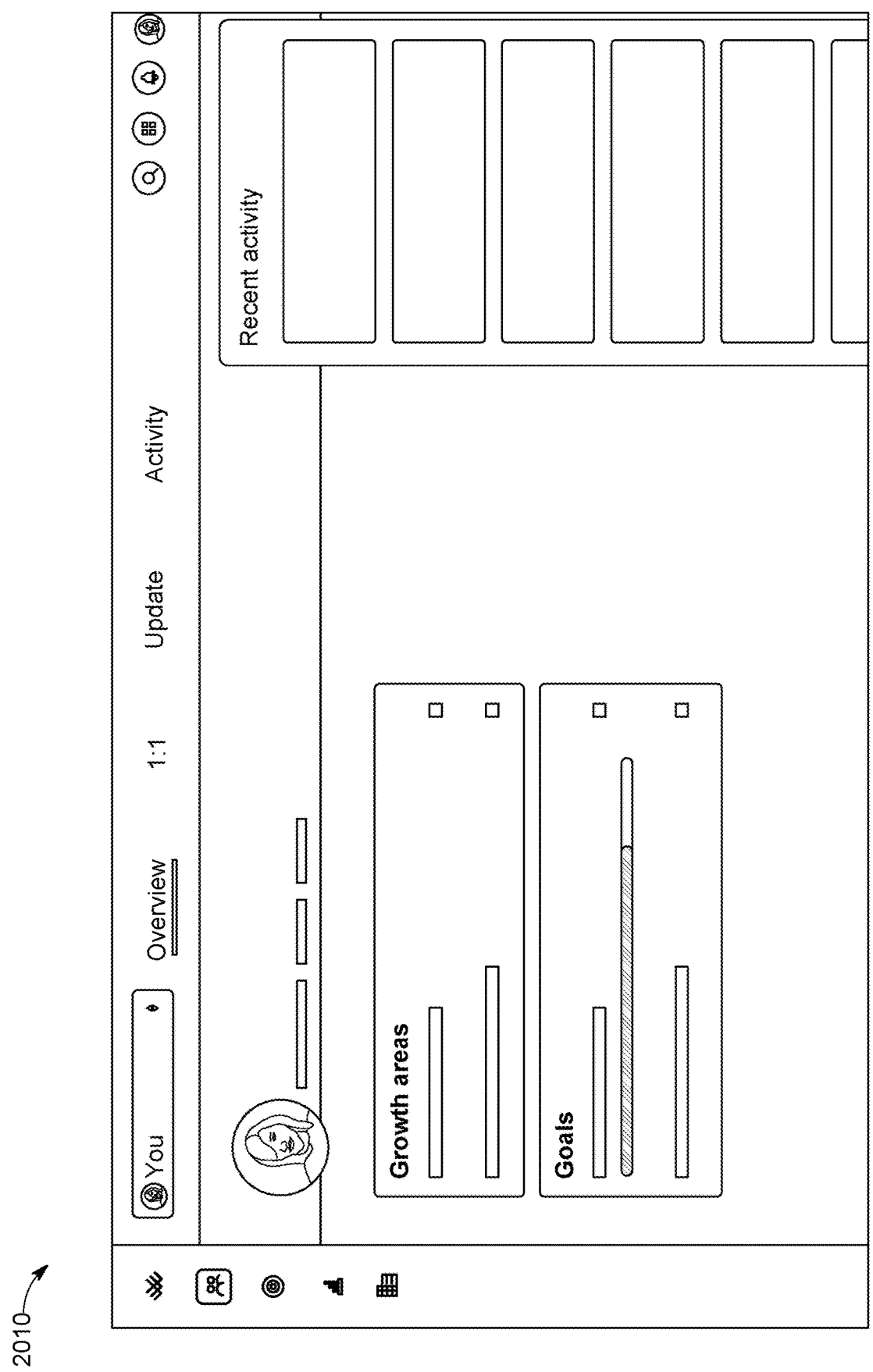
Figure 21:
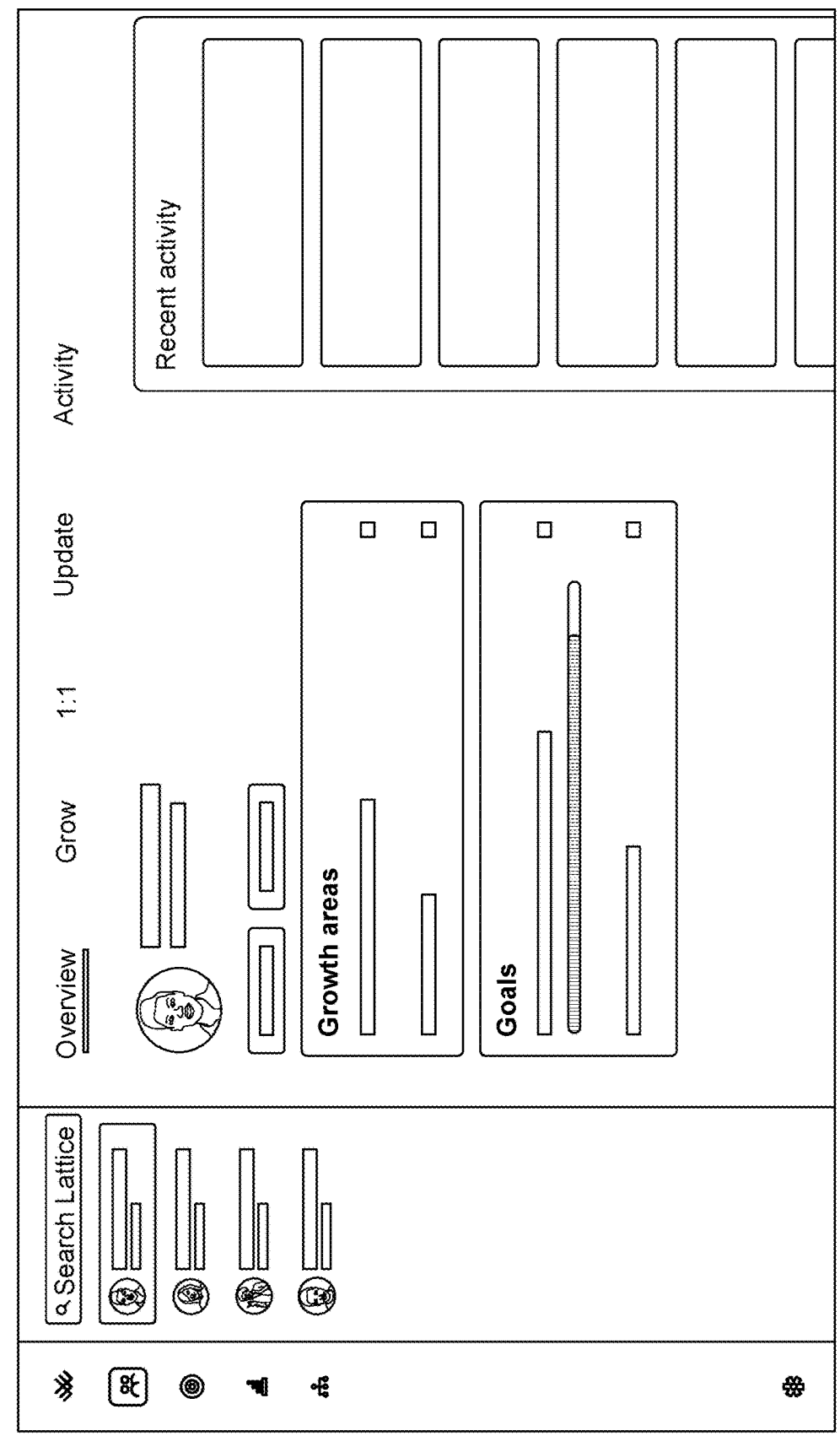
Figure 23:
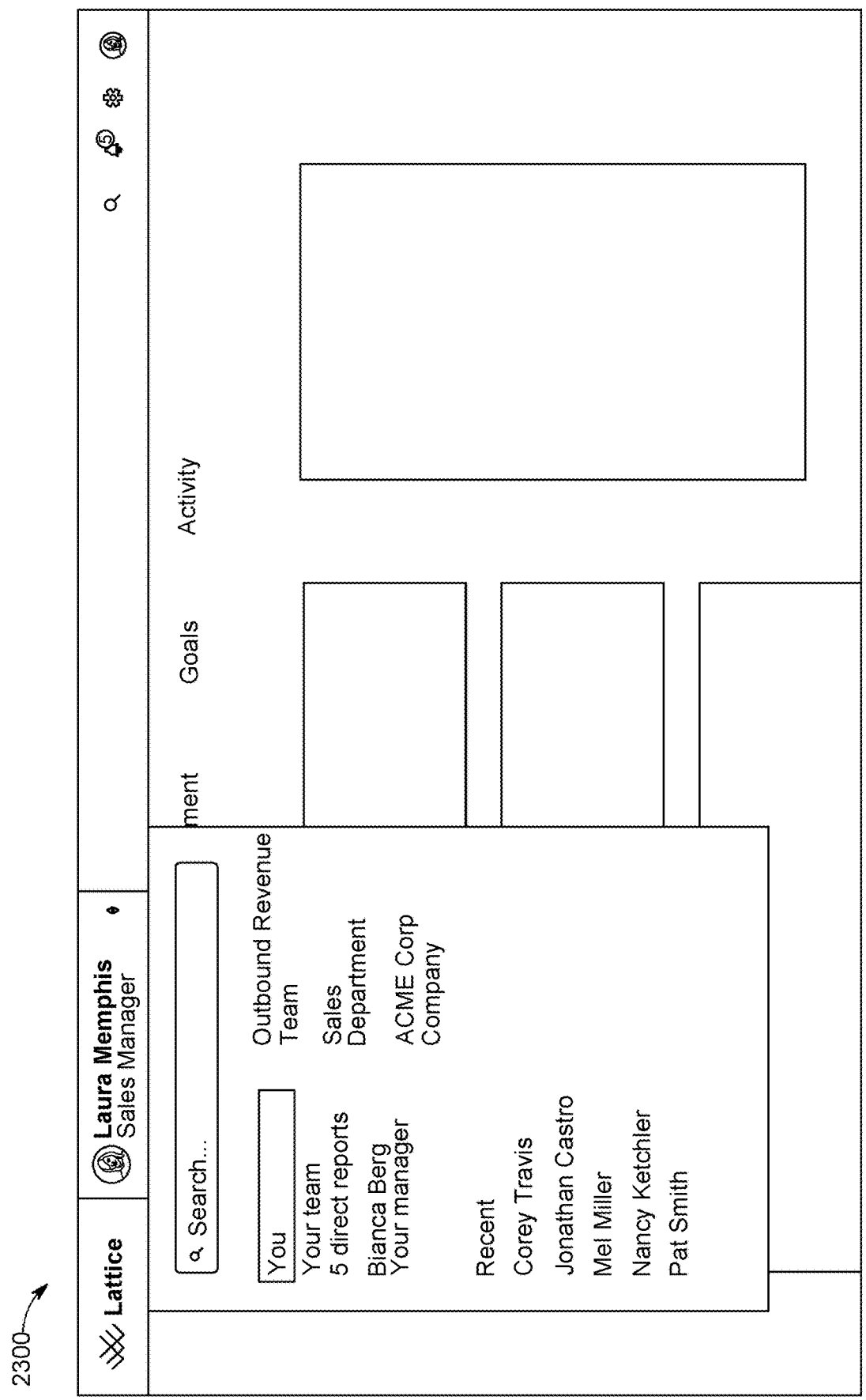
Figure 24:
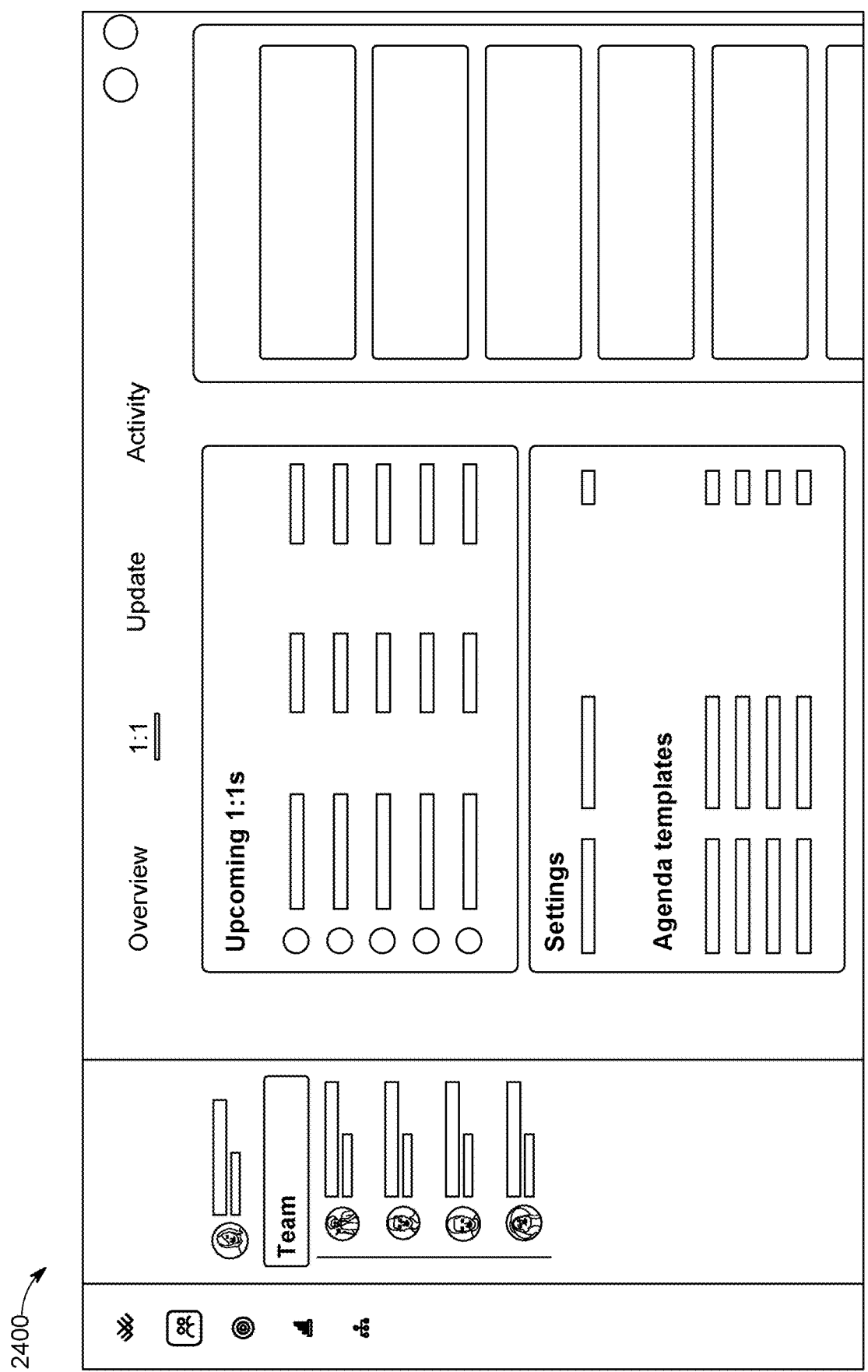
Figure 25:
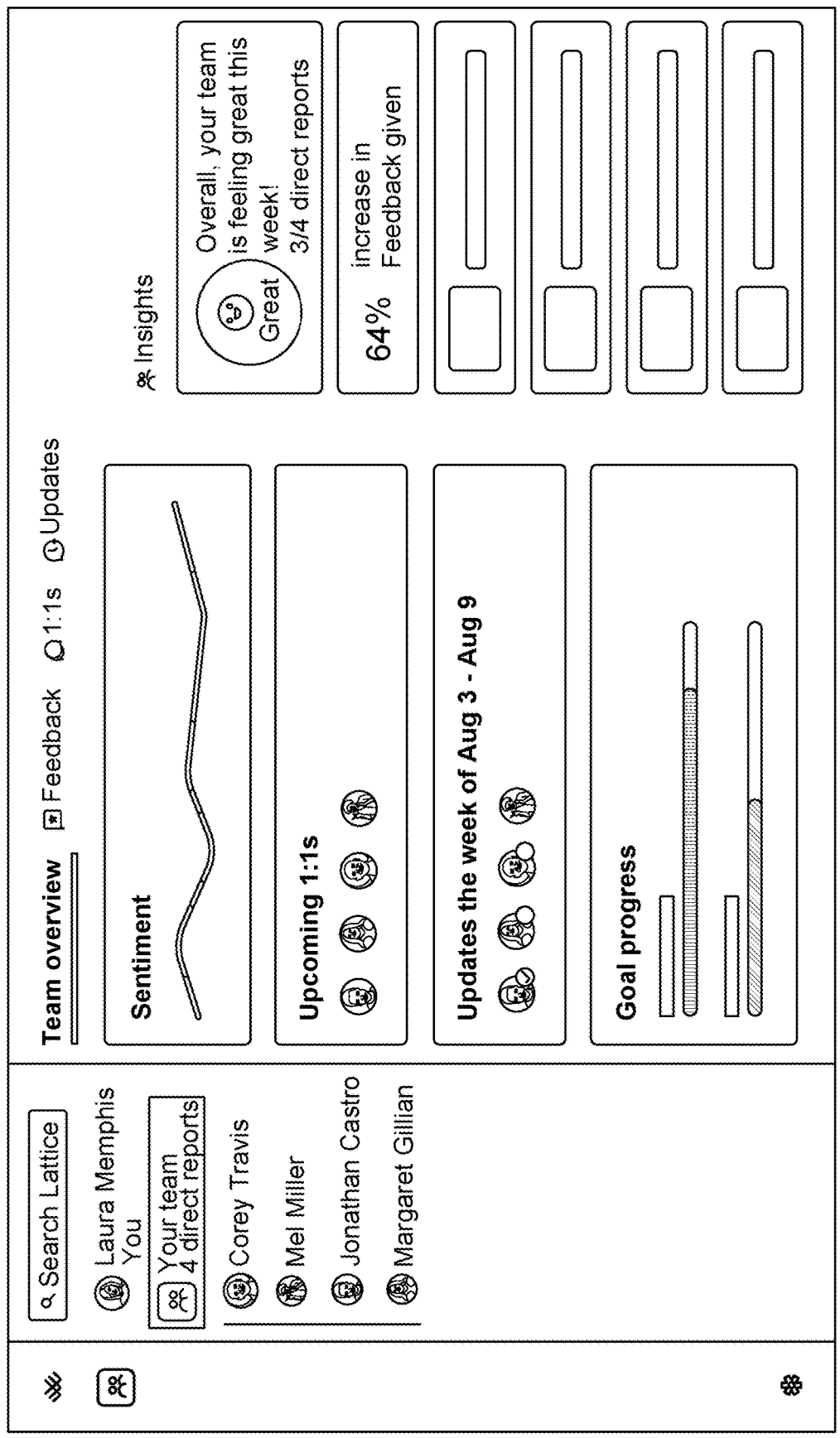
Figure 27:
Figure 45:
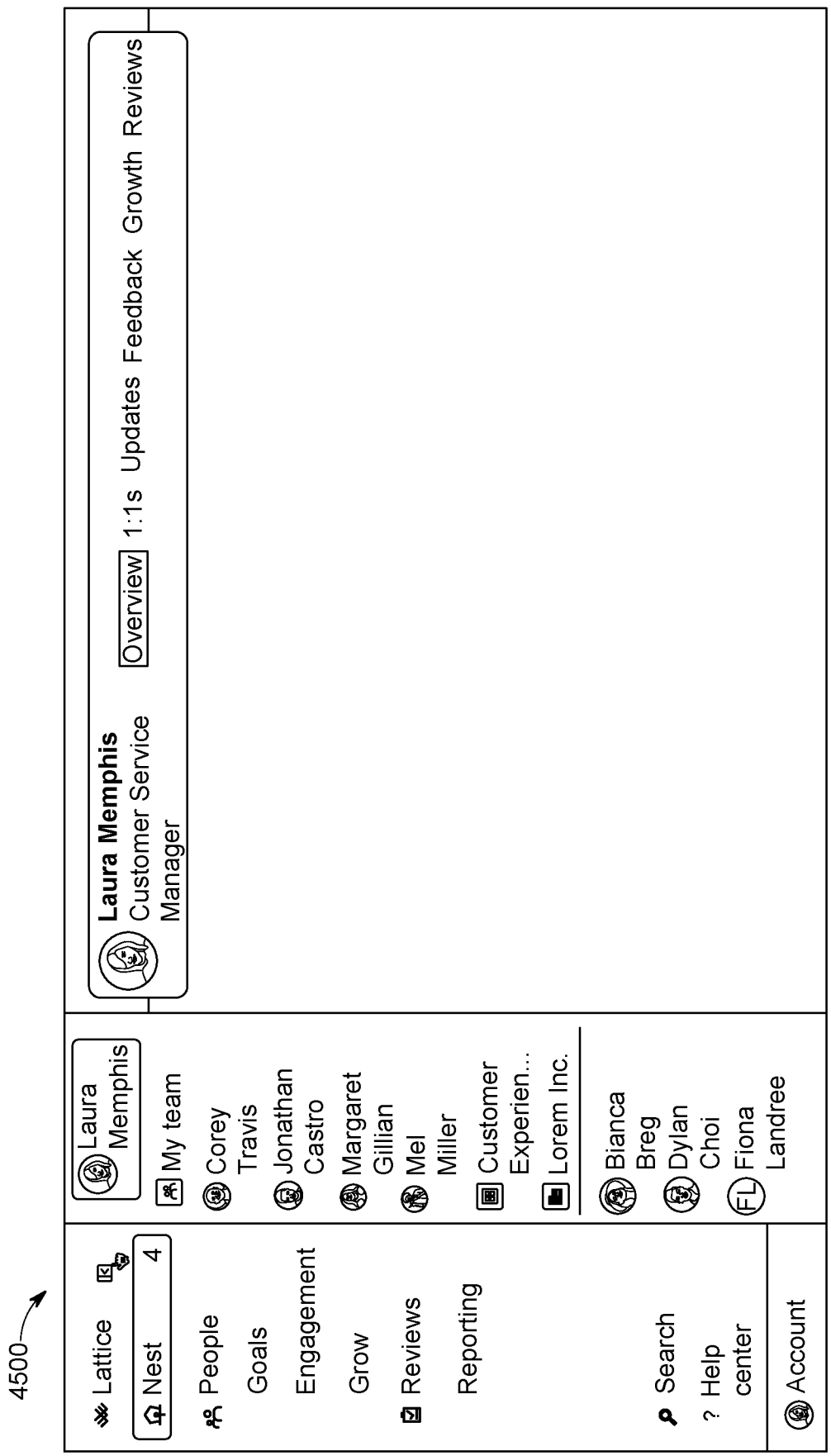

FIG. 13 is a block diagram of an example computer system 1700 on which methodologies and operations described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1700 includes a processor 1702 (e.g., a central processing unit (CPU), a graphics processing unit (GPU) or both), a main memory 1704 and a static memory 1706, which communicate with each other via a bus 1708. The computer system 1700 may further include a graphics display unit 1710 (e.g., a liquid crystal display (LCD) or a cathode ray tube (CRT)). The computer system 1700 also includes an alphanumeric input device 1712 (e.g., a keyboard or a touch-sensitive display screen), a user interface (UI) navigation device 1714 (e.g., a mouse), a storage unit 1716, a signal generation device 1718 (e.g., a speaker) and a network interface device 1720.

Machine-Readable Medium

The storage unit 1716 includes a machine-readable medium 1722 on which is stored one or more sets of instructions and data structures (e.g., software) 1724 embodying or utilized by any one or more of the methodologies or functions described herein. The instructions 1724 may also reside, completely or at least partially, within the main memory 1704 and/or within the processor 1702 during execution thereof by the computer system 1700, the main memory 1704 and the processor 1702 also constituting machine-readable media.

While the machine-readable medium 1722 is shown in an example embodiment to be a single medium, the term "machine-readable medium" may include a single medium or multiple media (e.g., a centralized or distributed database, and/or associated caches and servers) that store the one or more instructions 1724 or data structures. The term "machine-readable medium" shall also be taken to include any tangible medium that is capable of storing, encoding or carrying instructions (e.g., instructions 1724) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1724 may further be transmitted or received over a communications network 1726 using a transmission medium. The instructions 1724 may be transmitted using the network interface device 1720 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

FIGS. 14-48 are screenshots of various example interfaces 1400-4800 that may be generated and communicated for presentation on a client device. As shown, the user interfaces may include dynamic user interface elements, such as links or buttons, for activating one or more functions of one or more workplace tools. Additionally, the user interfaces may include various activatable user interface elements (e.g., menu items tabs) for navigating within the user interface, such as to cause various data or workplace tools to be displayed, collapsed, or expanded. As shown, the user interfaces may allow for viewing and editing of data in real-time, such as data corresponding to the categories of the user interface that are navigated to (e.g., via the main menu, collapsible secondary menu, and/or tabs). Together, the various example user interfaces 1400-4800 may be interconnected, as illustrated, to facilitate one or more workflows for users having various roles, such users having a management role, such that the users may quickly navigate to and access functions of one or more workplace tools that are most relevant (e.g., based on real-time access to data stored in one or more databases, such as data pertaining to attributes of the user, tasks assigned to the user, upcoming calendar appointments or meetings for the user, and so on).

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
one or more computer processors;
one or more computer memories;
a set of instructions stored in the one or more computer memories, the set of instructions configuring the one or more computer processors to perform operations, the operations comprising:
based on a detection of a selection of a menu item from a menu presented in a first region of a graphical user interface (GUI), causing display of a collapsible panel in a second region of the GUI, the collapsible panel including one or more additional menu items corresponding to one or more sub-categories associated with the menu item, the collapsible panel collapsible based on a detection of an additional selection of the menu item from the menu; and
based on a selection of one of the one or more additional menu items, loading data in real-time from a database for presentation in one or more content areas of a third region of the GUI, the data corresponding to a sub-category of the one or more sub-categories, and allowing dynamic access to a tool pertaining to the one of the one or more additional menu items, the tool being selected based on an association between the tool and the menu item or an association between the tool and the one or more sub-categories of the menu item, the allowing of the dynamic access including providing an activatable user interface element in the third region of the GUI, an activation of the activatable user interface element configured to invoke a functionality of the tool, the functionality of the tool allowing for editing of the data in real-time, wherein the loading of the data in real-time and the presentation in the one or more content areas includes rendering a first set of the data for presentation in a first content area of the one or more content areas in a first rendering stage and rendering a second set of the data for presentation in a second content area of the one or more content areas in a second rendering stage, wherein the order in which the first set of data and the second set of data are rendered is based on how quickly the first set of data and the second set of data are retrieved from the database.

2. The system of claim 1, the operations further comprising, based on the selection of the menu item from the menu, collapsing a textual representations of the menu item and other menu items in the menu into condensed graphical representations of the menu item and the other menu items such that the first region takes up less space in the GUI.

3. The system of claim 1, wherein, based on the first set of data loading faster than the second set of data, presenting a graphical indication in the second content area, the graphical indication indicating that the second set of data is still loading.

4. The system of claim 1, the operations further comprising accessing a template or schematic to associate the first set of data with the first rendering stage and to associate the second set of data with the second rendering stage.

5. The system of claim 4, wherein the template or schematic determines the first set of data items and the second set of data items based on a speed at which the first set of data items and the second set of data items is likely to be retrieved from the database.

6. A method comprising:
based on a detection of a selection of a menu item from a menu presented in a first region of a graphical user interface (GUI), causing display of a collapsible panel in a second region of the GUI, the collapsible panel including one or more additional menu items corresponding to one or more sub-categories associated with the menu item, the collapsible panel collapsible based on a detection of an additional selection of the menu item from the menu; and
detecting a selection of one of the one or more additional menu items;
based on the detecting of the selection of the one of the one or more additional menu items, loading data in real-time from a database for presentation in one or more content areas of a third region of the GUI, the data corresponding to a sub-category of the one or more sub-categories, and allowing dynamic access to a tool pertaining to the one of the one or more additional menu items, the tool being selected based on an association between the tool and the menu item or an association between the tool and the one or more sub-categories of the menu item, the allowing of the dynamic access including providing an activatable user interface element in the third region of the GUI, an activation of the activatable user interface element configured to invoke a functionality of the tool, the functionality of the tool allowing for editing of the data in real-time, wherein the loading of the data in real-time and the presentation in the one or more content areas includes rendering a first set of the data for presentation in a first content area of the one or more content areas in a first rendering stage and rendering a second set of the data for presentation in a second content area of the one or more content areas in a second rendering stage, wherein the order in which the first set of data and the second set of data are rendered is based on how quickly the first set of data and the second set of data are retrieved from the database.

7. The method of claim 6, further comprising, based on the selection of the menu item from the menu, collapsing a textual representations of the menu item and other menu items in the menu into condensed graphical representations of the menu item and the other menu items such that the first region takes up less space in the GUI.

8. The method of claim 6, wherein, based on the first set of data loading faster than the second set of data, presenting a graphical indication in the second content area, the graphical indication indicating that the second set of data is still loading.

9. The method of claim 6, further comprising accessing a template or schematic to associate the first set of data with the first rendering stage and to associate the second set of data with the second rendering stage.

10. The method of claim 9, wherein the template or schematic determines the first set of data items and the second set of data items based on a speed at which the first set of data items and the second set of data items is likely to be retrieved from the database.

11. A non-transitory computer-readable storage medium storing a set of instructions that, when executed by one or more computer processors, causes the one or more computer processors to perform operations, the operations comprising:
based on a detection of a selection of a menu item from a menu presented in a first region of a graphical user interface (GUI), causing display of a collapsible panel in a second region of the GUI, the collapsible panel including one or more additional menu items corresponding to one or more sub-categories associated with the menu item, the collapsible panel collapsible based on a detection of an additional selection of the menu item from the menu; and
based on a selection of one of the one or more additional menu items, loading data in real-time from a database for presentation in one or more content areas of a third region of the GUI, the data corresponding to a sub-category of the one or more sub-categories, and allowing dynamic access to a tool pertaining to the one of the one or more additional menu items, the tool being selected based on an association between the tool and the menu item or an association between the tool and the one or more sub-categories of the menu item, the allowing of the dynamic access including providing an activatable user interface element in the third region of the GUI, an activation of the activatable user interface element configured to invoke a functionality of the tool, the functionality of the tool allowing for editing of the data in real-time, wherein the loading of the data in real-time and the presentation in the one or more content areas includes rendering a first set of the data for presentation in a first content area of the one or more content areas in a first rendering stage and rendering a second set of the data for presentation in a second content area of the one or more content areas in a second rendering stage, wherein the order in which the first set of data and the second set of data are rendered is based on how quickly the first set of data and the second set of data are retrieved from the database.

12. The non-transitory computer-readable storage medium of claim 11, the operations further comprising, based on the selection of the menu item from the menu, collapsing a textual representations of the menu item and other menu items in the menu into condensed graphical representations of the menu item and the other menu items such that the first region takes up less space in the GUI.

13. The non-transitory computer-readable storage medium of claim 11, wherein, based on the first set of data loading faster than the second set of data, presenting a graphical indication in the second content area, the graphical indication indicating that the second set of data is still loading.

14. The non-transitory computer-readable storage medium of claim 11, the operations further comprising accessing a template or schematic to associate the first set of data with the first rendering stage and to associate the second set of data with the second rendering stage.

* * * * *